(12) United States Patent
Hu et al.

(10) Patent No.: US 12,535,172 B2
(45) Date of Patent: Jan. 27, 2026

(54) SYSTEMS, DEVICES, AND METHODS FOR IN SITU PIPE REPAIR

(71) Applicants: UNIVERSITY OF MARYLAND, COLLEGE PARK, College Park, MD (US); Diakont Advanced Technologies, Inc., Carlsbad, CA (US)

(72) Inventors: Liangbing Hu, Rockville, MD (US); Paul Albertus, Takoma Park, MD (US); Qi Dong, Newton, MA (US); Chengwei Wang, College Park, MD (US); Edward Petit de Mange, Carlsbad, CA (US)

(73) Assignees: University of Maryland, College Park, College Park, MD (US); Diakont Advanced Technologies, Inc., Carlsbad, CA (US)

( * ) Notice: Subject to any disclaimer, the term of this patent is extended or adjusted under 35 U.S.C. 154(b) by 537 days.

(21) Appl. No.: 17/991,323

(22) Filed: Nov. 21, 2022

(65) Prior Publication Data
US 2023/0175630 A1 Jun. 8, 2023

Related U.S. Application Data

(60) Provisional application No. 63/264,439, filed on Nov. 22, 2021.

(51) Int. Cl.
*F16L 55/1645* (2006.01)
*F16L 55/18* (2006.01)

(52) U.S. Cl.
CPC ........... *F16L 55/1645* (2013.01); *F16L 55/18* (2013.01)

(58) Field of Classification Search
CPC .............................. F16L 55/1645; F16L 55/18
See application file for complete search history.

(56) References Cited

U.S. PATENT DOCUMENTS 5,451,351 A * 9/1995 Blackmore ......... B29C 63/0069
264/269
5,855,676 A * 1/1999 Lu ............................. B05C 7/04
118/421

(Continued)

FOREIGN PATENT DOCUMENTS

CN 105441766 B 1/2018
CN 109468480 A 3/2019

(Continued)

OTHER PUBLICATIONS

Govender et al., "Sintering High Green Density Direct Powder Rolled Titanium Strips, in Argon Atmosphere," *Metals*, Jun. 2021, 11(6): 936. (21 pages).

(Continued)

*Primary Examiner* — David R Deal
(74) *Attorney, Agent, or Firm* — RowanTree Law Group, PLLC; Frederick F. Rosenberger

(57) ABSTRACT

A system for in situ repair of a metal pipe has a pipe repair head, an actuation assembly, an electrical power supply, and a controller. The pipe repair head can have an arm extending along a radiation direction of the pipe and a Joule heating element coupled to a distal end portion of the arm. The actuation assembly can move the pipe repair head along the axial and/or circumferential directions of the metal pipe. The controller controls the actuation assembly to position the pipe repair head with respect to a surface portion of the inner circumferential wall. The controller can then control the electrical power supply to apply a current pulse to the Joule heating element so as to generate a temperature of at least 1000° C. proximal to the surface portion, thereby sintering a metal powder in a slurry on the surface portion to form a metal repair layer.

20 Claims, 15 Drawing Sheets

(56) References Cited

U.S. PATENT DOCUMENTS

| | | | |
|---|---|---|---|
| 7,052,567 B1 * | 5/2006 | Blackmore | F16L 55/1645 425/389 |
| 7,258,720 B2 | 8/2007 | Fuwa et al. | |
| 11,193,191 B2 | 12/2021 | Yao et al. | |
| 11,369,929 B2 | 6/2022 | Hu et al. | |
| 2001/0013388 A1 | 8/2001 | Miyazaki et al. | |
| 2002/0102136 A1 * | 8/2002 | Holland | B29C 63/34 405/184.1 |
| 2005/0241712 A1 * | 11/2005 | Blackmore | F16L 47/03 138/98 |
| 2006/0037955 A1 * | 2/2006 | Gueugnaut | B29C 66/91443 219/535 |
| 2007/0071631 A1 | 3/2007 | Laschutza et al. | |
| 2008/0272110 A1 * | 11/2008 | Kamiyama | F16L 55/1651 219/535 |
| 2011/0139351 A1 * | 6/2011 | Morton | F16L 55/18 156/185 |
| 2015/0184785 A1 * | 7/2015 | Richards, Jr. | F16L 58/1027 138/97 |
| 2016/0186909 A1 * | 6/2016 | Boulet D'Auria | F16L 53/38 138/99 |
| 2021/0341091 A1 * | 11/2021 | Nielsen-Cole | F16L 55/1645 |
| 2022/0219986 A1 | 7/2022 | Hu et al. | |
| 2022/0241756 A1 | 8/2022 | Hu et al. | |

FOREIGN PATENT DOCUMENTS

| | | |
|---|---|---|
| JP | S61-180895 A | 8/1986 |
| JP | 2004-232329 A | 8/2004 |
| JP | 2019-094539 A | 6/2019 |
| WO | 2019/099928 A2 | 5/2019 |
| WO | 2020/236767 A1 | 11/2020 |
| WO | WO 2022/204494 A1 | 9/2022 |
| WO | WO 2023/014986 A1 | 2/2023 |

OTHER PUBLICATIONS

Li et al., "Interfacial Bonding and Abrasive Wear Behavior of Iron Matrix Composite Reinforced by Ceramic Particles," *Materials*, 2019, 12(22): 3646. (13 pages).

Wang et al., "Rapid Synthesis and Sintering of Metals from Powders," *Advanced Science*, Jun. 2021 (published online Mar. 8, 2021), 8(12):2004229. (6 pages).

* cited by examiner

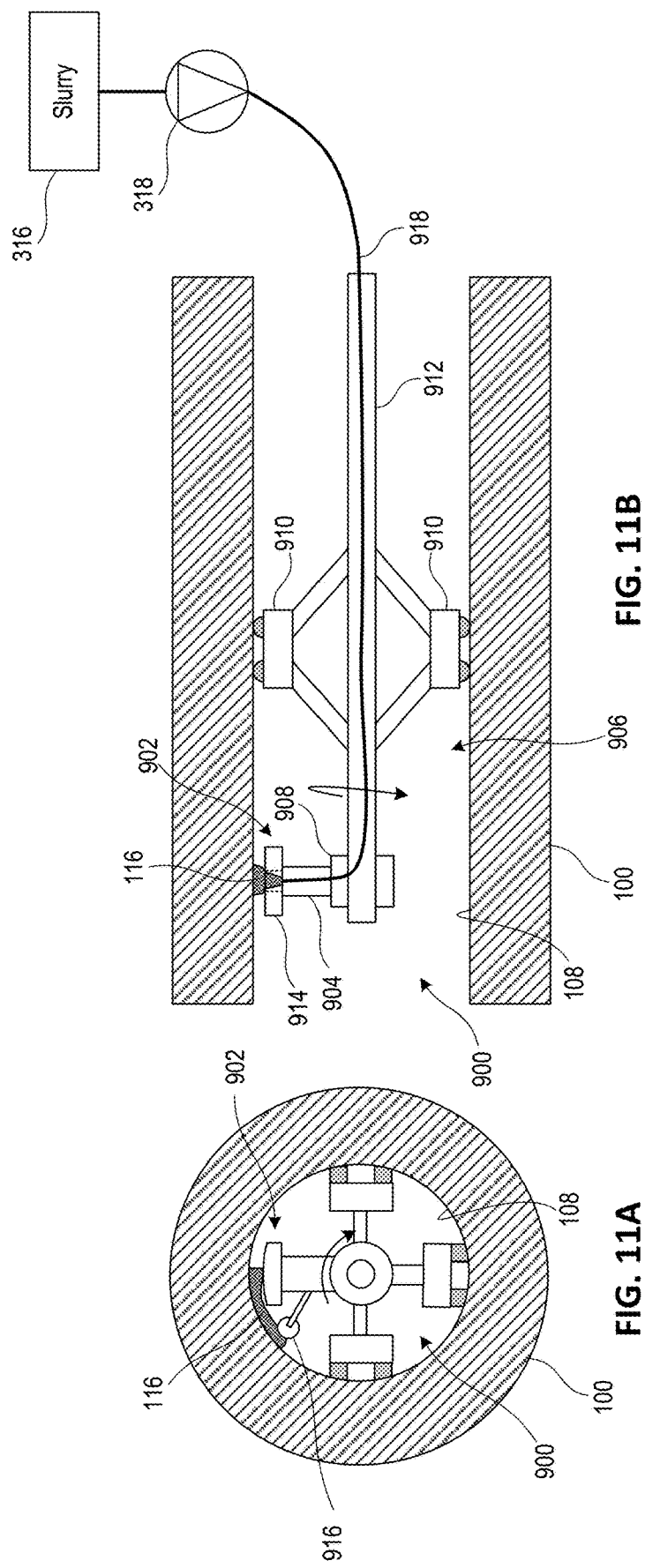

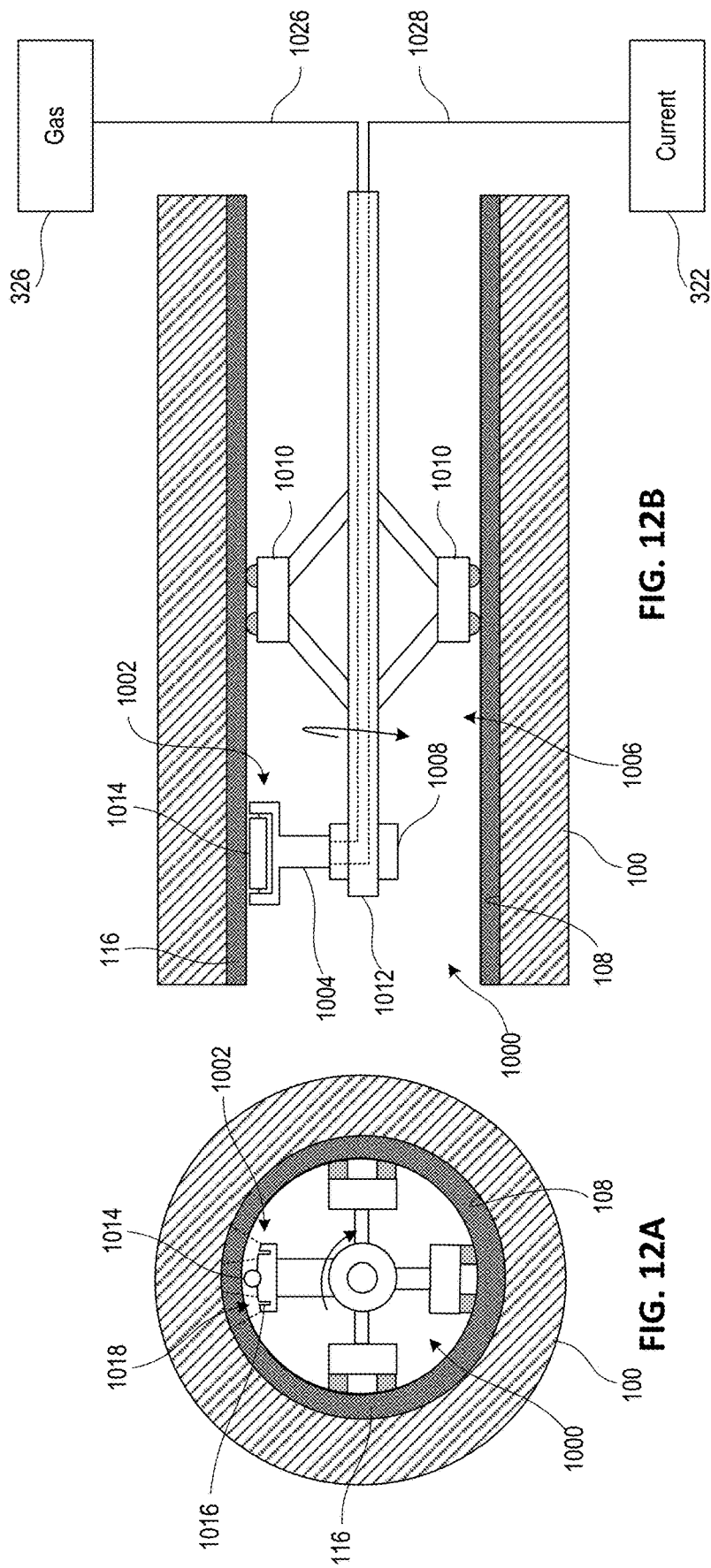

SYSTEMS, DEVICES, AND METHODS FOR IN SITU PIPE REPAIR

CROSS-REFERENCE TO RELATED APPLICATION

The present application claims the benefit of U.S. Provisional Application No. 63/264,439, filed Nov. 22, 2021, entitled "System, Device, and Methods for Rapid Sintering of Metal Coatings for Pipe Repairing," which is incorporated by reference herein in its entirety.

STATEMENT REGARDING FEDERALLY SPONSORED RESEARCH

This invention was made with government support under DEAR0001329 awarded by the U.S. Department of Energy. The government has certain rights in the invention.

FIELD

The present disclosure relates generally to pipe repair, and more particularly, to systems, devices, and methods for in situ repair of metal pipes, for example, by deposition and sintering of metal coatings.

BACKGROUND

There are about 20,000 miles of cast iron pipes and about 40,000 miles of bare steel pipes in the United States, a large percentage of which are due for replacement or repair. However, existing methods for repairing metal pipes are expensive or generate metal components insufficient for long-term pipe use. For example, directed energy deposition (DED) is a known additive manufacturing technique that employs laser/arc metal deposition. While DED has been used for manufacturing metal or alloy components, components fabricated by DED can have a high surface roughness (e.g., >50 μm) and residual stress, which can affect the mechanical stability of any fabricated pipe or repaired portion thereof over its lifetime (e.g., 50 years of use).

In another example, laser melting can be used to form a metal layer. However, laser melting also introduces surface roughness to the resulting components due to locally high temperatures. To avoid anisotropic properties, components formed by laser melting may require specially designed heat treatments. Moreover, laser melting for powder based additive manufacturing can require high quality spherical shape powders with a specific size distribution, which directly impacts the build quality. Laser melting techniques may also require complex and expensive instruments that would not be suitable for on-site operation to repair a pipe. Even if laser melting systems could be employed within a pipe for repair, the relatively small laser beam size and relatively slow scan rate would significantly limit its application for scalable pipe-in-pipe deposition process.

In another example, a metal layer can be formed via a thermal spray, where molten metals or alloys are accelerated (e.g., through a Laval nozzle) in an inert atmosphere to be atomized and then deposited onto a cool substrate. Again, the expensive and complex equipment required for thermal spray may limit its ability to cost-effectively repair metal pipes. In addition, due to particle erosion, the nozzle throat of the thermal spray equipment is subject to extensive wear, which in turn leads to poor quality coatings (e.g., low density and poor uniformity). Additionally, metal layers formed by thermal spray can be limited to relatively thin thicknesses (e.g., <1 mm) with low bonding to the underlying material.

Embodiments of the disclosed subject matter may address one or more of the above-noted problems and disadvantages, among other things.

SUMMARY

Embodiments of the disclosed subject matter system provide in situ repair of an existing metal pipe, for example, by depositing and sintering a metal coating on a surface of the pipe. In some embodiments, a portion of an existing pipe can be repaired by the sintered metal coating (e.g., a patch). Alternatively or additionally, a new replacement pipe within the existing pipe can be formed by the sintered metal coating (e.g., a pipe-in-pipe configuration). In some embodiments, the new replacement pipe may serve as a structural element (e.g., capable of withstanding about the same or greater forces than the original pipe), not just a non-structural coating designed to block or prevent leakage. In some embodiments, the pipe repair can employ a Joule-heating element (e.g., strip or bar) to sinter the deposited coating, for example, by providing high-temperature radiation sintering (HRS) (e.g., with the heating element spaced from the deposited pre-sintered coating) or high-temperature conduction sintering (e.g., with the heating element in contact with the deposited pre-sintered coating).

In some embodiments, one or more metal powders with micron-scale particle sizes (e.g., ~50 μm or less) can be mixed with a polymeric binder (e.g., ~1-5 wt %) and a solvent to form a slurry. The slurry can then be coated onto a target pipe surface (e.g., an inner or outer wall of an existing pipe, or a joint) and optionally at least partially dried (e.g., via evaporation of the solvent). The metal powder layer can then be sintered by a short-duration exposure (e.g., ~10-60 s) to a high-temperature (e.g., close to or greater than a melting temperature of the metal, for example, ~2000° C.) by a heating element. In some embodiments, the heating element can scan over the metal powder layer at a close distance (e.g., ~5 mm or less) or in contact (e.g., light contact) to sinter the powder layer, thereby forming a solid metal layer that can serve as a new pipe or repaired pipe portion. In some embodiments, the sintered metal layer (e.g., steel) can have a relative density (e.g., relative to a nominal density of the metal) of at least 80% (e.g., up to 95%, or even greater than 95%) and/or a thickness in a range of ~1-5 mm.

In one or more embodiments, a system for in situ repair of a metal pipe can comprise a first pipe repair head, a support member, an actuation assembly, an electrical power supply, and a controller. The first pipe repair head can comprise a first arm and a Joule heating element. The first arm can extend along a radial direction of the metal pipe. The Joule heating element can be coupled to a distal end portion of the first arm so as to face an inner circumferential wall of the metal pipe. The support member can extend along an axial direction of the metal pipe, and the first pipe repair head can be coupled to the support member. The actuation assembly can be constructed to move the first pipe repair head along the axial direction of the metal pipe, along a circumferential direction of the metal pipe, or along both the axial and circumferential directions. The electrical power supply can be operatively coupled to the Joule heating element. The controller can be operatively coupled to the actuation assembly and the electrical power supply. The controller can comprise one or more processors and computer readable storage media storing instructions that, when executed by the one or more processors, cause the controller to (a) position, via the actuation assembly, the first pipe repair head with respect to a surface portion of the inner circumferential wall, and (b) apply, via the electrical power supply, a first current pulse to the Joule heating element such that the Joule heating element generates a first temperature of at least 1000° C. proximal to the surface portion.

In some embodiments, a system for in situ repair of a metal pipe can further comprise a second pipe repair head, a supply of repair slurry, and a pump. The second pipe repair head can be coupled to the support member. The second pipe repair head can comprise a second arm and a slurry deposition nozzle. The second arm can extend along the radial direction of the metal pipe, and the slurry deposition nozzle can be coupled to a distal end portion of the second arm so as to face the inner circumferential wall of the metal pipe. The repair slurry can comprise a powder of metal, a polymeric binder, and an organic solvent. The pump can be operatively coupled to the slurry deposition nozzle and the supply of repair slurry, and the controller can be operatively coupled to the pump. The actuation assembly can be further constructed to move the second pipe repair head along the axial direction, along the circumferential direction, or along both the axial and circumferential directions. The computer readable storage media can store additional instructions that, when executed by the one or more processors, cause the controller to (e) position, via the actuation assembly, the second pipe repair head with respect to a second surface portion of the inner circumferential wall, and (f) dispense, via the pump and the slurry deposition nozzle, an amount of repair slurry from the supply onto the second surface portion.

Any of the various innovations of this disclosure can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed technology will become more apparent from the following detailed description, which proceeds with reference to the accompanying figures.

BRIEF DESCRIPTION OF THE DRAWINGS

Embodiments will hereinafter be described with reference to the accompanying drawings, which have not necessarily been drawn to scale. Where applicable, some elements may be simplified or otherwise not illustrated in order to assist in the illustration and description of underlying features. Throughout the figures, like reference numerals denote like elements.

FIGS. 11A-11B are radial and axial cross-sectional views, respectively, of an exemplary configuration of a pipe repair system for depositing a slurry, according to one or more embodiments of the disclosed subject matter.

FIGS. 12A-12B are radial and axial cross-sectional views, respectively, of another exemplary configuration of a pipe repair system for sintering a deposited slurry, according to one or more embodiments of the disclosed subject matter.

DETAILED DESCRIPTION

General Considerations

Figure 1A:
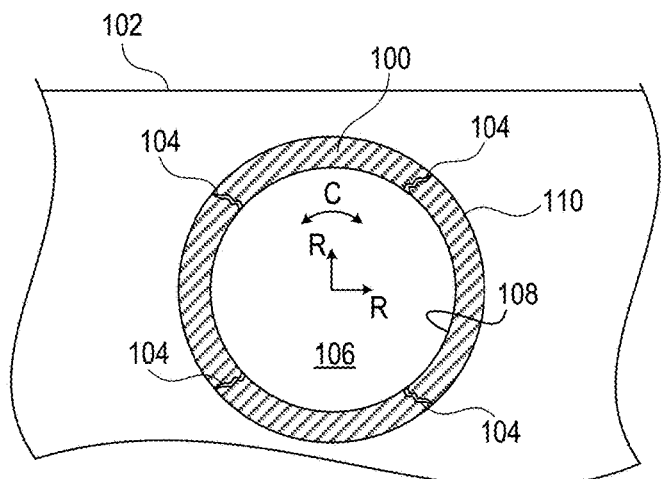
FIG. 1A is a simplified cross-sectional view of an existing metal pipe to which embodiments of the disclosed subject matter are applicable.

For purposes of this description, certain aspects, advantages, and novel features of the embodiments of this disclosure are described herein. The disclosed methods and systems should not be construed as being limiting in any way. Instead, the present disclosure is directed toward all novel and nonobvious features and aspects of the various disclosed embodiments, alone and in various combinations and subcombinations with one another. The methods and systems are not limited to any specific aspect or feature or combination thereof, nor do the disclosed embodiments require that any one or more specific advantages be present, or problems be solved. The technologies from any embodiment or example can be combined with the technologies described in any one or more of the other embodiments or examples. In view of the many possible embodiments to which the principles of the disclosed technology may be applied, it should be recognized that the illustrated embodiments are exemplary only and should not be taken as limiting the scope of the disclosed technology.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one skilled in the art.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person skilled in the art to have a more definitive construction, the numerical parameters set forth are approximations that may depend on the desired properties sought and/or limits of detection under standard test conditions/methods, as known to those skilled in the art. When directly and explicitly distinguishing embodiments from discussed prior art, the embodiment numbers are not approximates unless the word "about" is recited. Whenever "substantially," "approximately," "about," or similar language is explicitly used in combination with a specific value, variations up to and including 10% of that value are intended, unless explicitly stated otherwise.

Directions and other relative references may be used to facilitate discussion of the drawings and principles herein but are not intended to be limiting. For example, certain terms may be used such as "inner," "outer," "upper," "lower," "top," "bottom," "interior," "exterior," "left," "right," "front," "back," "rear," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" part can become a "lower" part simply by turning the object over. Nevertheless, it is still the same part, and the object remains the same.

As used herein, "comprising" means "including," and the singular forms "a" or "an" or "the" include plural references unless the context clearly dictates otherwise. The term "or" refers to a single element of stated alternative elements or a combination of two or more elements unless the context clearly indicates otherwise.

Although there are alternatives for various components, parameters, operating conditions, etc. set forth herein, that does not mean that those alternatives are necessarily equivalent and/or perform equally well. Nor does it mean that the alternatives are listed in a preferred order, unless stated otherwise. Unless stated otherwise, any of the groups defined below can be substituted or unsubstituted.

Unless explained otherwise, all technical and scientific terms used herein have the same meaning as commonly understood to one skilled in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Features of the presently disclosed subject matter will be apparent from the following detailed description and the appended claims.

Overview of Terms

The following explanations of specific terms and abbreviations are provided to facilitate the description of various aspects of the disclosed subject matter and to guide those skilled in the art in the practice of the disclosed subject matter.

Sintering temperature: A maximum temperature at a surface of a heating element when energized (e.g., by application of a current pulse). In some embodiments, the sintering temperature is about or greater than a melting temperature of metal particles in a deposited slurry. In some embodiments, the temperature is at least 1500° C., for example, approximately 2000° C. In some embodiments, a temperature at the deposited slurry (e.g., at a surface facing or in contact with the heating element) can match or substantially match (e.g., within 10%) the temperature of the heating element.

Particle size: A maximum cross-sectional dimension (e.g., diameter) of each particle in a slurry. In some embodiments, an identified particle size represents an average particle size for all particles in the slurry (e.g., an average of the maximum cross-sectional dimensions). In some embodiments, an identified particle size represents an average particle size for subsets of particles in the slurry, for example, having a bimodal distribution of particle sizes. In some embodiments, the particle size can be measured according to one or more known standards, such as, but not limited to, ASTM B214-16 entitled "Standard Test Method for Sieve Analysis of Metal Powders," ASTM B330-20 entitled "Standard Test Methods for Estimating Average Particle Size of Metal Powders and Related Compounds Using Air Permeability," ASTM B822-20 entitled "Standard Test Method for Particle Size Distribution of Metal Powders and Related Compounds by Light Scattering," and ASTM B922-20 entitled "Standard Test Method for Metal Powder Specific Surface Area by Physical Adsorption," all of which are incorporated by reference herein.

Inert gas: A gas that does not undergo a chemical reaction when subjected to the sintering temperature and any materials present. In some embodiments, the inert gas is nitrogen, argon, helium, neon, krypton, xenon, radon, oganes son, or any combination of the foregoing.

Pipe repair: For an existing metal pipe, providing a sintered metal coating over some or all of a circumferential surface of the pipe. In some embodiments, the sintered metal coating can enhance the strength of the existing pipe, mitigate defects (e.g., cracks) in the wall of the existing pipe, and/or extend a service life of the existing pipe. In some embodiments, the provision of a sintered metal coating for pipe repair may be considered a reconditioning, e.g., without explicit detection of any defects in the existing pipe wall. In some embodiments, the provision of a sintered metal coating for pipe repair forms a new pipe wall that can operate in place of (e.g., by removing the existing pipe or allowing the existing pipe to degrade in place) or in conjunction with (e.g., as a pipe-in-pipe configuration) the existing pipe.

Metal: Includes those individual chemical elements classified as metals on the periodic table, including alkali metals, alkaline earth metals, transition metals, lanthanides, and actinides, as well as alloys formed from such metals, such as, but not limited to, steel (e.g., stainless steel), brass, bronze, Monel, etc.

Introduction

In one or more embodiments, an existing metal pipe (e.g., a steel or cast iron pipe, for example, having an inner diameter of 10 inches) can be repaired by forming a new metal layer thereon via application of a rapid pulse (e.g., ~60 seconds or less, such as ~10 seconds or less) of high temperature (e.g., near or greater than a melting temperature of the metal and/or greater than 1500° C., such as ~2000° C.) to sinter a metal powder coating. In some embodiments, the pipe repair can occur in situ (e.g., with the existing pipe remaining in its previously installed location, such as buried underground, and/or with the existing pipe continuing in active operation, such as conveying natural gas). In some embodiments, a portion of the existing pipe can be repaired by the sintered metal coating (e.g., a patch). Alternatively or additionally, a new replacement pipe within the existing pipe can be formed by the sintered metal coating (e.g., a pipe-in-pipe configuration).

In some embodiments, the existing metal pipe repair can involve at least precursor deposition and subsequent sintering. For precursor deposition, one or more metal powders with micron-scale particle sizes (e.g., <1 mm, such as ~50 μm or less) can be mixed with a polymeric binder (e.g., ~1-5 wt %) and a solvent to form a slurry. In some embodiments, the metal powders for the slurry can be composed of micron-scale particles of the metal itself (e.g., steel, such as American Petroleum Institute (API) X100 steel) and/or micron-scale particles of the constituent metal (e.g., Fe, Mn, Ni, Cr). The slurry can be coated onto a target pipe surface (e.g., an inner or outer wall of an existing pipe) and optionally at least partially dried (e.g., via evaporation of the solvent) prior to sintering. The slurry can have a composition and viscosity that allows for substantially conformal application to arbitrary surfaces (e.g., sharp corners or bends) that may normally be present in a network of pipes.

The metal powder layer can be sintered by a short-duration exposure (e.g., ~10-60 s) to a high temperature (e.g., near or greater than a melting temperature of the metal, for example, ~2000° C.) by a heating element. In some embodiments, the heating element can have a curved configuration and/or be flexible to allow adoption of a curved configuration, for example, to allow sintering of uneven surfaces (e.g., corners or bends). For example, the heating element can be a Joule-heating element (e.g., a strip or bar of carbon), which can generate a radiation spectrum that is broadband and thus not material specific (e.g., able to sinter a range of different materials). In some embodiments, the heating element can scan over the pre-sintered slurry layer at a close distance (e.g., ~5 mm or less) or in contact therewith, while a current pulse is continuously or periodically applied to the heating element to generate the short-duration high temperature, thereby sintering the powder layer to form a solid metal layer that can serve as a new pipe or repaired pipe portion. In some embodiments, the sintered metal layer (e.g., steel) can have a relative density (e.g., relative to a nominal density of the metal) of at least 80% (e.g., up to 95%, or even greater than 95%), a thickness in a range of ~1-5 mm, inclusive, and/or be substantially-free of voids or connected pores (e.g., to be leak-tight with respect to a gas or liquid carried by the pipe). In some embodiments, the sinter metal layer can have a mechanical strength (e.g., tensile strength or compression strength) that is at least 600 MPa.

In some embodiments, the new pipe formed by sintered metal layer can be retained within the existing pipe (e.g., a pipe-in-pipe configuration), for example, to allow the new pipe to take over service when the existing pipe becomes out of service and/or to extend a service life of the existing pipe. In some embodiments, the new pipe (e.g., an outer circumferential surface) can be in contact with and/or coupled to the existing pipe (e.g., an inner circumferential surface). Alternatively, in some embodiments, the existing pipe can be removed from the new pipe or otherwise allowed to degrade, such that the new pipe alone continues to provide fluid conveying service.

Sintered Metal Coatings for Pipe Repair

FIG. 1A shows an installation of an existing pipe 100, for example, buried within the ground 102 (or other surrounding material, such as a wall or floor of a building). The existing pipe 100 can have an annular wall that defines an inner circumferential surface 108, an outer circumferential surface 110, and an interior volume 106 bounded by the inner circumferential surface 108. Fluid (e.g., liquid or gas, such as natural gas which comprises methane) can be carried by the interior volume 106 along an axial direction A (perpendicular to a cross-sectional plane containing the circumferential direction C and the radial direction R, e.g., perpendicular to the page in FIG. 1A) of pipe 100. In some embodiments, the existing pipe can have an inner diameter along the radial direction R of at least 8 inches and may be considered, for example, a pipe main. The existing pipe 100 can have one or more defects 104 (e.g., cracks) in the wall and/or may be nearing the end of its intended service lifetime (e.g., 50 years from installation).

Figure 1B:
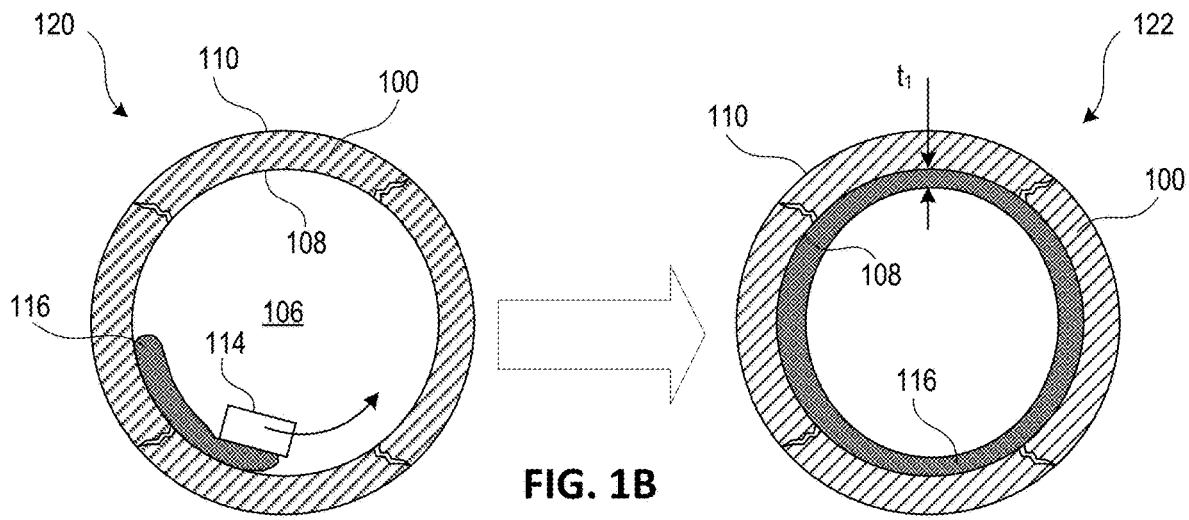
FIG. 1B is a simplified cross-sectional view illustrating a slurry application phase of an exemplary pipe repair method, according to one or more embodiments of the disclosed subject matter.

In some embodiments, the existing pipe 100 can be repaired, reconditioned, and/or replaced by sintering a metal powder slurry coated coating over part or all of a circumferential surface (e.g., inner surface 108) of the pipe 100. For example, FIG. 1B illustrates a slurry application stage 120 for repairing pipe 100. In the illustrated example, a slurry application device 114 can be used to spread, extrude, print, dispense, or otherwise apply a slurry 116 onto the inner circumferential surface 108 of the pipe 100. In some embodiments, the slurry can be applied to an entire circumference of the inner surface 108, for example, as shown at 122, to form a substantially conformal layer having a thickness $t_1$ along the radial direction, for example, less than or equal to 5 mm (e.g., 2-5 mm, inclusive, such as about 3 mm). In some embodiments, the slurry application device 114 can apply the slurry layer 116 on the surface 108 via a brush, a spatula or doctor blade, an extrusion nozzle (e.g., printhead, syringe), a spray nozzle, or a conduit (e.g., dispensing pipe).

In some embodiments, the slurry can be a mixture (e.g., mechanical mixing) of one or more metal powders, one or more binders, and one or more solvents. In some embodiments, the slurry 116 can consist essentially of (e.g., consist of) the one or more metal powders, the one or more binders, and the one or more solvents. The composition of the slurry can be adjusted (e.g. by varying respective amounts/concentrations of powder, binder, and solvent) to provide a viscosity of the slurry that allows it to be applied as a conformal coating from the slurry application device 114 and to remain in place on the pipe surface prior to and during sintering. For example, the slurry can have a viscosity in a range of 0.5 Pa·s to 5 Pa·s, inclusive.

The one or more metal powders can comprise elemental metals (e.g., aluminum, titanium), metal alloys (e.g., steel, such as X100 steel or stainless steel 316L), and/or constituents for forming metal alloys (e.g., iron, manganese, nickel, and chromium). In some embodiments, particles in the powder cab have a particle size that is in the micron-scale (e.g., less than 1 mm, such as 150 μm or less), for example, 50 μm or less (e.g., 10 μm or less, such as ~5 μm). Alternatively or additionally, the powder can have a distribution of particle sizes, for example, such that an average or median particle size is in the micron-scale (e.g., less than 1 mm), for example, 50 μm or less (e.g., ~5 μm). Alternatively or additionally, the powder can have a multi-modal distribution of particle sizes, for example, a bimodal distribution of particle sizes, such as a first set of particles having an average particle size greater than 10 μm (e.g., about 50 μm) and a second set of particles having an average particle size less than or equal to 10 μm (e.g., about 5 μm).

In some embodiments, the one or more binders can comprise a polymeric binder, such as a wax or water-soluble polymer. For example, the polymeric binder can include poly(vinylpolypyrrolidone) (PVP), polyvinyl alcohol (PVA), or both PVP and PVA. In some embodiments, an amount of the polymer binder(s) in the slurry can be less than or equal to 5 wt %, for example, in a range of 1-5 wt % inclusive, such as about 3 wt %. In some embodiments, the solvent can be water or an organic solvent, for example, an alcohol solvent. For example, the solvent can include methanol, ethanol, isopropyl alcohol (IPA), acetone, or any combination thereof.

Figure 1C:
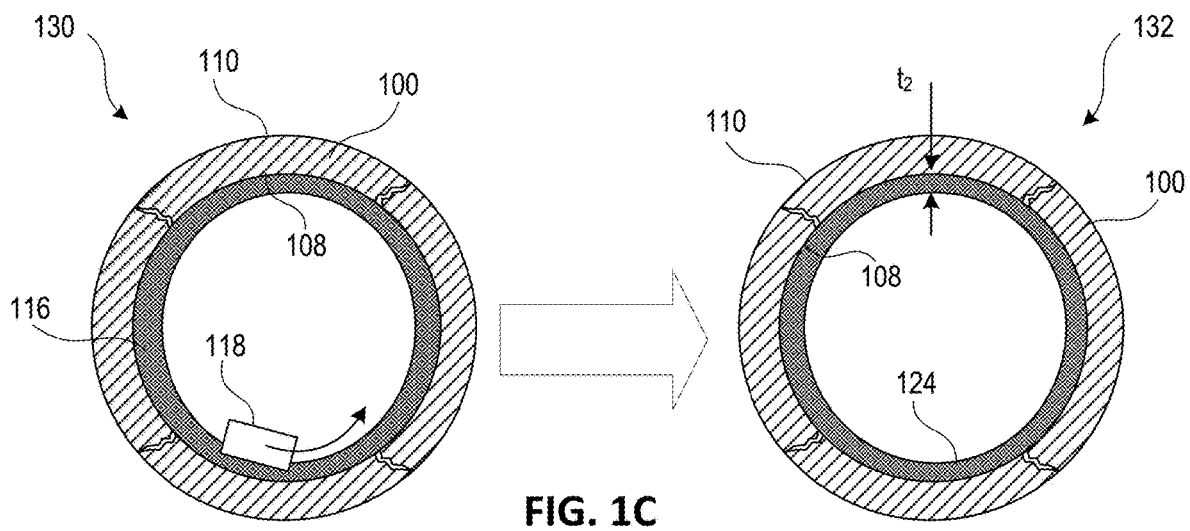
FIG. 1C is a simplified cross-sectional view illustrating a densification phase of an exemplary pipe repair method, according to one or more embodiments of the disclosed subject matter.

In some embodiments, the slurry layer applied to the existing pipe can be compacted or densified prior to sintering. For example, FIG. 1C illustrates a densification stage 130 where a densification device 118 can be used to radially press the deposited slurry layer 116 into a denser coating. For example, as shown at 132, the densification device 118 can form a substantially uniform layer 124 having a thickness $t_2$ along the radial direction that is, for example, at least 10% less than $t_1$. For example, after the pressing by densification device 118, the thickness can be reduced from a $t_1$ of ~3 mm to a $t_2$ of ~2.5 mm. In some embodiments, the densification device 118 can be formed of a material that does not stick (or at least resists adhering) to the applied slurry, for example, a polymer such as glass, a ceramic, a polymer (e.g., polypropylene, polytetrafluoroethylene (PTFE), etc.) or combinations thereof. In some embodiments, the densification device 118 can employ a roller (e.g., that rolls along the surface of layer 116 about the circumferential direction) or a curved platen (e.g., that moves along the radial direction perpendicular to the surface of layer 116).

Figure 1D:
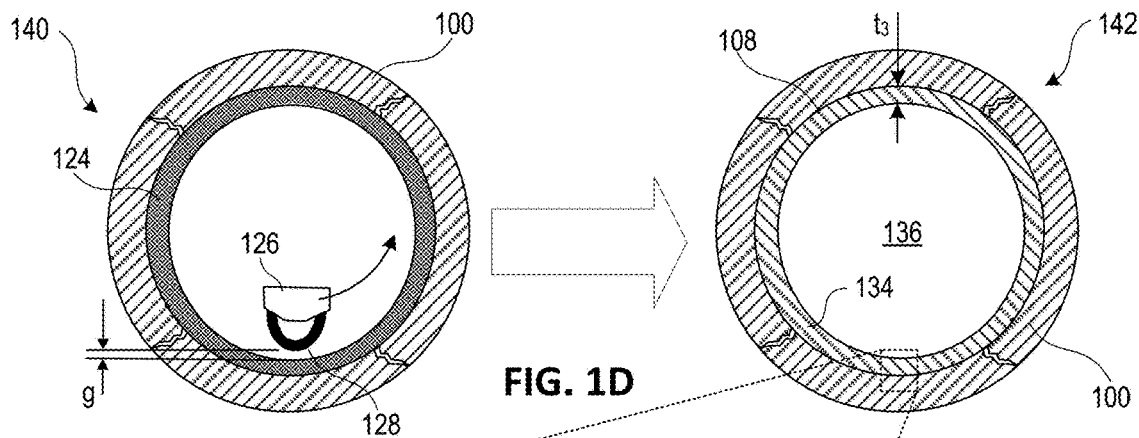
FIG. 1D is a simplified cross-sectional view illustrating a sintering phase of an exemplary pipe repair method, according to one or more embodiments of the disclosed subject matter.

In some embodiments, the slurry layer (either after densification or without any densification) can be partially or fully dried (e.g., to remove some or all of the solvent therefrom), for example, by air drying, forced air flow, infrared irradiation, or any combination thereof. In some embodiments, the slurry layer (after densification, after drying, or without any densification or drying) can be subjected to a sintering temperature (e.g., ≥1500° C., such as ~2000° C.), for example, about or greater than a melting temperature of a metal powder of the slurry layer, such that the metal powder is sintered into a solid metal layer. For example, FIG. 1D illustrates a sintering stage 140 where a sintering head 126 with a Joule heating element 128 (e.g., formed of carbon, silicon carbide, metal, or any combination thereof) can be used to generate the sintering temperature. In some embodiments, the Joule heating element 128 can expose a portion of the slurry layer 124 to the sintering temperature for a short period of time (e.g., ≤60 seconds, such as ~10 seconds) so as to convert the exposed portion into the solid metal layer.

As shown in FIG. 1D, during sintering, the heating element 128 can be spaced along the radial direction from a facing surface of the slurry layer 124 by a gap of 5 mm or less, for example, to provide radiative heating. Alternatively, in some embodiments, the heating element 128 can be in contact with the surface of the slurry layer 124, for example, to provide conductive heating. In some embodiments, a current pulse can be applied to the Joule heating element 128 to generate sintering temperature, and the Joule heating element 128 can be constructed to rapidly heat (e.g., a heating ramp rate of at least $10^{2\circ}$ C./s, such as at least $10^{3\circ}$ C./s or at least $10^{4\circ}$ C./s, or a heating ramp rate in a range of $10^2$ to $10^{4\circ}$ C./s, inclusive) to the sintering temperature (e.g., from room temperature, such as 20-25° C., or from an ambient temperature within the pipe that is less than 500° C.) and/or to rapidly cool (e.g., a cooling ramp rate of at least $10^{2\circ}$ C./s, such as at least $10^{3\circ}$ C./s or at least $10^{4\circ}$ C./s, or a cooling ramp rate in a range of $10^2$ to $10^{4\circ}$ C./s, inclusive) from the sintering temperature (e.g., back to room temperature, such as 20-25° C., or back to an ambient temperature within the pipe that is less than 500° C.). In some embodiments, a gas flow (e.g., inert gas) can be directed at the heating element and/or the recently-sintered metal layer to enhance cooling (e.g., to achieve a cooling ramp rate in a range of $10^2$ to $10^{4\circ}$ C./s).

In some embodiments, after sintering of a first portion of slurry layer 124, the sintering head 126 can then move along the circumferential direction to expose a next portion of the slurry layer 124 to the sintering temperature, which exposure and circumferential movement can be repeated until an entire annular metal pipe 134 is formed within the existing pipe 100, as shown at 142. In some embodiments, the new pipe 134 can have a thickness $t_3$ along the radial direction that is, for example, less than or equal to 5 mm (e.g., 2-5 mm, inclusive, such as about 3 mm), and can define a new inner volume 136 for conveying a fluid.

Figure 1E:
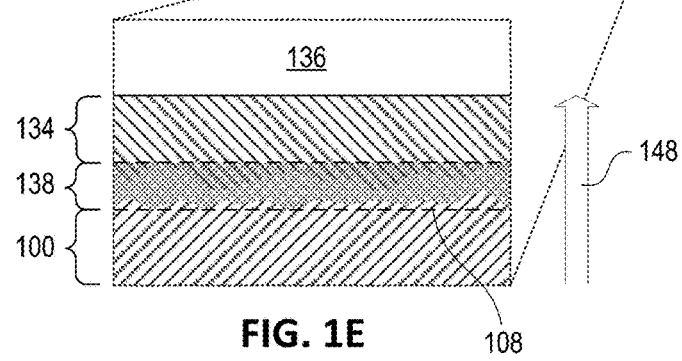
FIG. 1E is a magnified cross-sectional view of an inner circumferential surface portion of the repaired pipe, according to one or more embodiments of the disclosed subject matter.

In some embodiments, the heating via sintering head 126 can be effective to define a metal inner pipe 134 in contact with and adhered to the inner circumferential surface 108 of the existing pipe 100. The short-pulse, high-temperature heating can be effective to minimize residual stress in the sintered pipe layer 134 and/or avoid formation of detrimental material phases. Alternatively or additionally, in some embodiments, the heating via sintering head 126 can be effective to define a transition layer 138 intervening between (e.g., in contact with) the metal inner pipe 134 and the existing pipe 100, as shown in FIG. 1E. In some embodiments, the transition layer 138 can be un-sintered or partially sintered slurry. For example, the short-pulse, high-temperature heating can be effective to form a gradient 148 of material properties between the existing pipe 100, the transition layer 138 and/or the sintered inner pipe 134. In some embodiments, the material properties of the gradient 148 may be density, mechanical strength (e.g., yield strength), hardness, adhesion, etc. For example, a radially-inner part of the pipe layer 134 (e.g., facing inner volume 136) can have a density, hardness, and/or strength greater than that of the radially-outer part of the pipe layer 134 (e.g., facing existing pipe 100) and/or the transition layer 138.

Figure 1F:
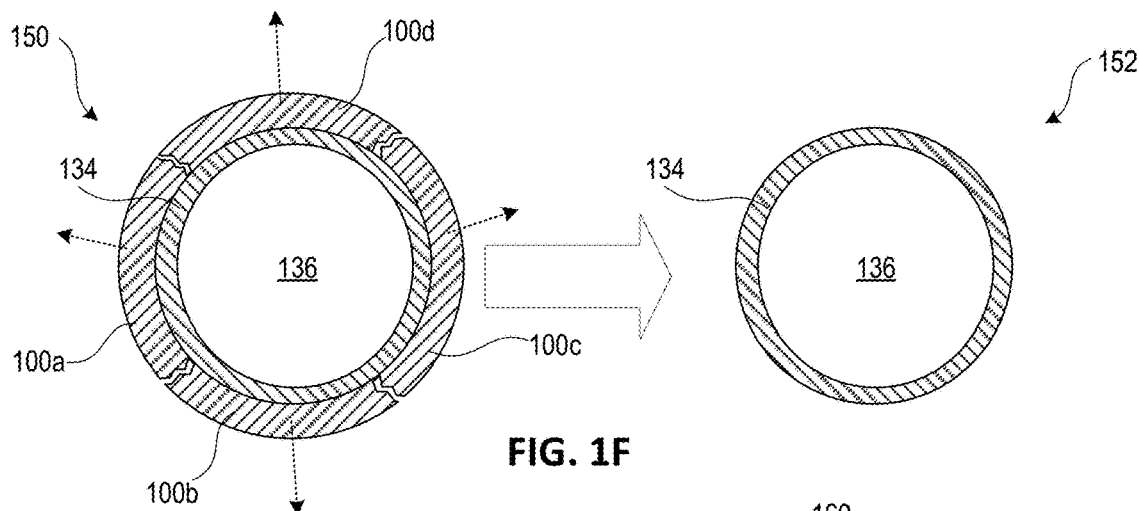
FIG. 1F illustrates optional removal of the existing pipe for use of the sintered metal coating as a replacement pipe, according to one or more embodiments of the disclosed subject matter.

In some embodiments, the transition layer can be a separate layer added prior to slurry application in stage 120 and constructed to improve adhesion of layer 134 after sintering to the existing pipe 100. Alternatively, in some embodiments, the transition layer can be constructed to decrease adhesion of layer 134 to the existing pipe 100. For example, after sintering, the existing pipe 100 can be divided into sections 100a-100d and removed from the inner pipe 134 at pipe removal stage 150, thereby leaving the inner pipe 134 alone to provide service, as shown at stage 152 in FIG. 1F. Alternatively, instead of dividing into sections, the existing pipe 100 can be removed as a whole by displacing the existing pipe along its axial direction. Alternatively, the existing pipe 100 can be maintained in place and allowed to degrade over time, while the inner pipe 134 remains to provide service independently.

Figure 1G:
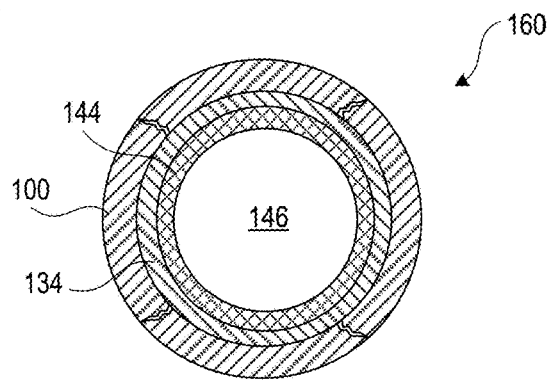
FIG. 1G illustrates an optional repaired pipe configuration with multiple sintered metal coatings, according to one or more embodiments of the disclosed subject matter.

In some embodiments, the slurry application stage of FIG. 1B (with or without optional densification stage of FIG. 1C) and the sintering stage of FIG. 1D can be repeated. For example, FIG. 1G shows an exemplary configuration 160 of an inner pipe formed of a first sintered layer 134 over an inner circumferential surface of the existing pipe 100 and a second sintered layer 144 over an inner circumferential surface of the first sintered layer 134. In some embodiments, the first sintered layer 134 and the second sintered layer 144 can be formed of substantially the same material and/or have substantially the same material properties, for example, to form an inner pipe of increased thickness (e.g., >5 mm). Alternatively, in some embodiments, the first sintered layer 134 can be formed of a different material and/or have different material properties from the second sintered layer 144, for example, to provide a circumferential surface bounding inner volume 146 that is more resistant to a chemical flowing therethrough. Although FIG. 1G illustrates only two sintered layers 134, 144, three or more sintered layers are also possible according to one or more contemplated embodiments.

Figure 2:
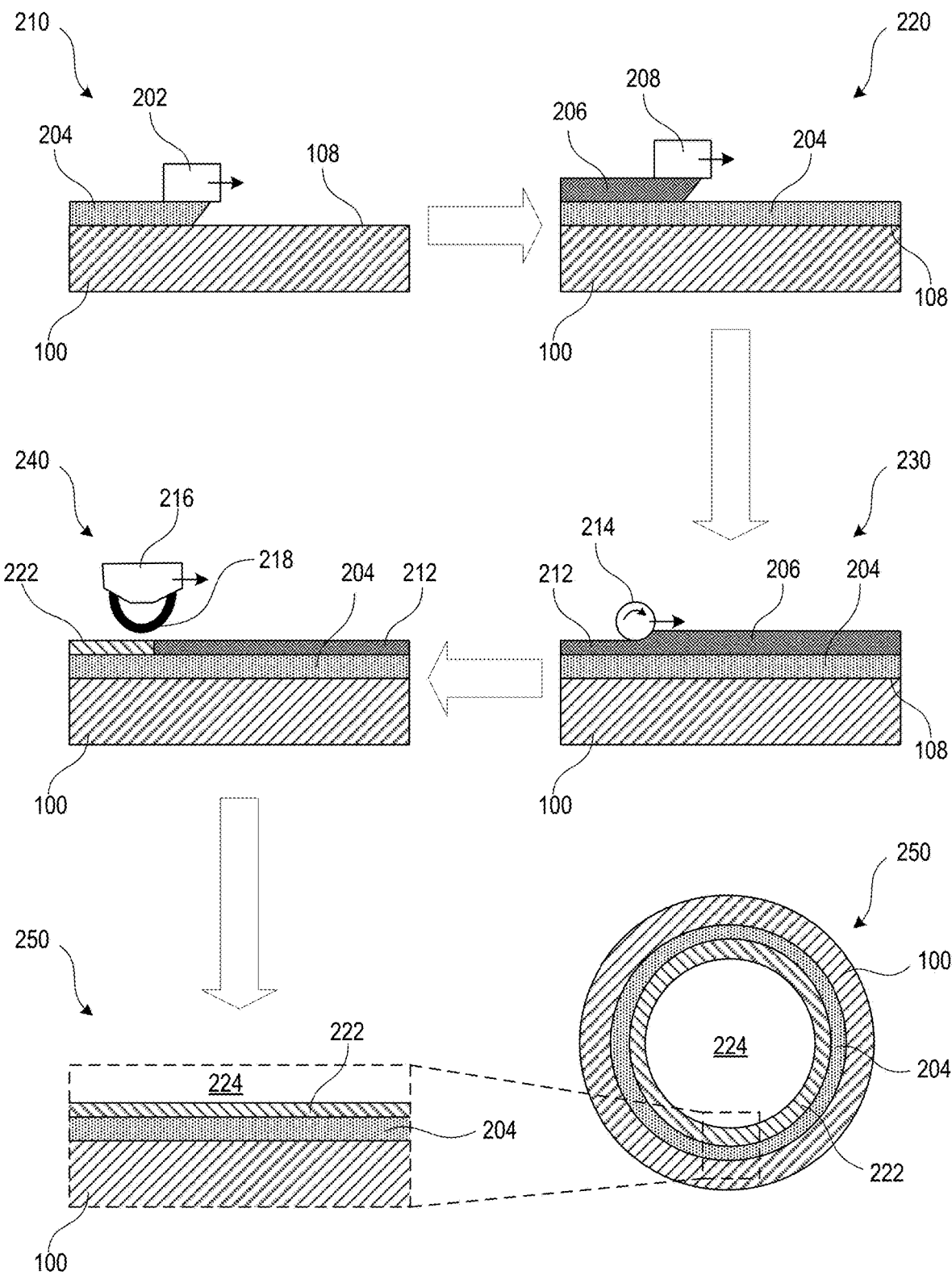
FIG. 2 illustrates phases of another exemplary pipe repair method employing an intervening insulating layer, according to one or more embodiments of the disclosed subject matter.

Some existing pipes (e.g., iron-based pipes) may have and/or be attached to plastic components, which may not be able to survive high temperatures in a vicinity of sintering operations. Alternatively or additionally, for environmental or safety concerns, it may be beneficial to ensure the high temperature of the sintering is not conveyed through the wall of the existing pipe, for example, to avoid generation of steam on the exterior of the existing pipe. For example, in some embodiments, it may be desirable to maintain a temperature at an exterior surface of the existing pipe to be no more than about ~75° C. Accordingly, in some embodiments, an insulating layer can be formed between the slurry and the existing pipe. For example, as shown in FIG. 2, the insulating layer 204 can be dispensed by an application device 202 (e.g., brush, a spatula or doctor blade, an extrusion nozzle, a spray nozzle, or a conduit) onto or over the existing pipe 100 during deposition stage 210. Other techniques for depositing or forming the insulating layer 204 are also possible according to one or more contemplated embodiments, such as vapor deposition, sputtering, chemical reaction (e.g., oxidation), etc.

At slurry application stage 220, a slurry 206 can be applied by slurry application device 208 onto or over the insulating layer 204, for example, in a manner similar to that described above with respect to FIG. 1B. At densification stage 230, the applied slurry 206 can be densified by densification device 214 (e.g., roller) to form densified slurry layer 212, for example, in a manner similar to that described above with respect to FIG. 1C. At sintering stage 240, a Joule-heating element 218 of sintering head 216 can be used to serially sinter the slurry layer 212 into a solid metal coating 222, for example, in a manner similar to that described above with respect to FIG. 1D. In some embodiments, the insulating layer 204 can serve a protective function, for example, to prevent, or at least reduce an amount of, heat generated by the Joule-heating element 218 during sintering stage 240 from reaching the existing pipe 100. Accordingly, the heat generated by Joule-heating element 218 can be mostly used for sintering the slurry layer 212 rather than heating the pipe 100, thereby improving energy efficiency while also avoiding high temperatures within a wall of pipe 100 and/or external to pipe 100. The final multi-layer structure 250 has a radially inner-most metal layer 222 bounding an inner volume 224 (e.g., thereby forming a new pipe), a radially outer-most existing pipe 100, and an annular insulating layer 204 intervening between the metal layer 222 and the existing pipe 100.

In some embodiments, the insulating layer 204 can be porous. Alternatively or additionally, in some embodiments, the insulating layer 204 can have a thermal conductivity that is less than that of the slurry 206, the sintered coating 222, and/or the existing pipe 100. In some embodiments, the insulating layer 204 can be formed of an oxide with a high melting temperature (e.g., having a melting temperature greater than that of a metal in the slurry), for example, $SiO_2$, $Al_2O_3$, $TiO_2$, etc. Alternatively, in some embodiments, the insulating layer 204 can be formed of a low thermal conductivity material, such as boron nitride. Alternatively, in some embodiments, the insulating layer 204 can comprise a portion of slurry 206 or a separate layer of slurry that has not been sintered and/or has been formed to be porous.

Pipe Repair Systems

Figure 3:
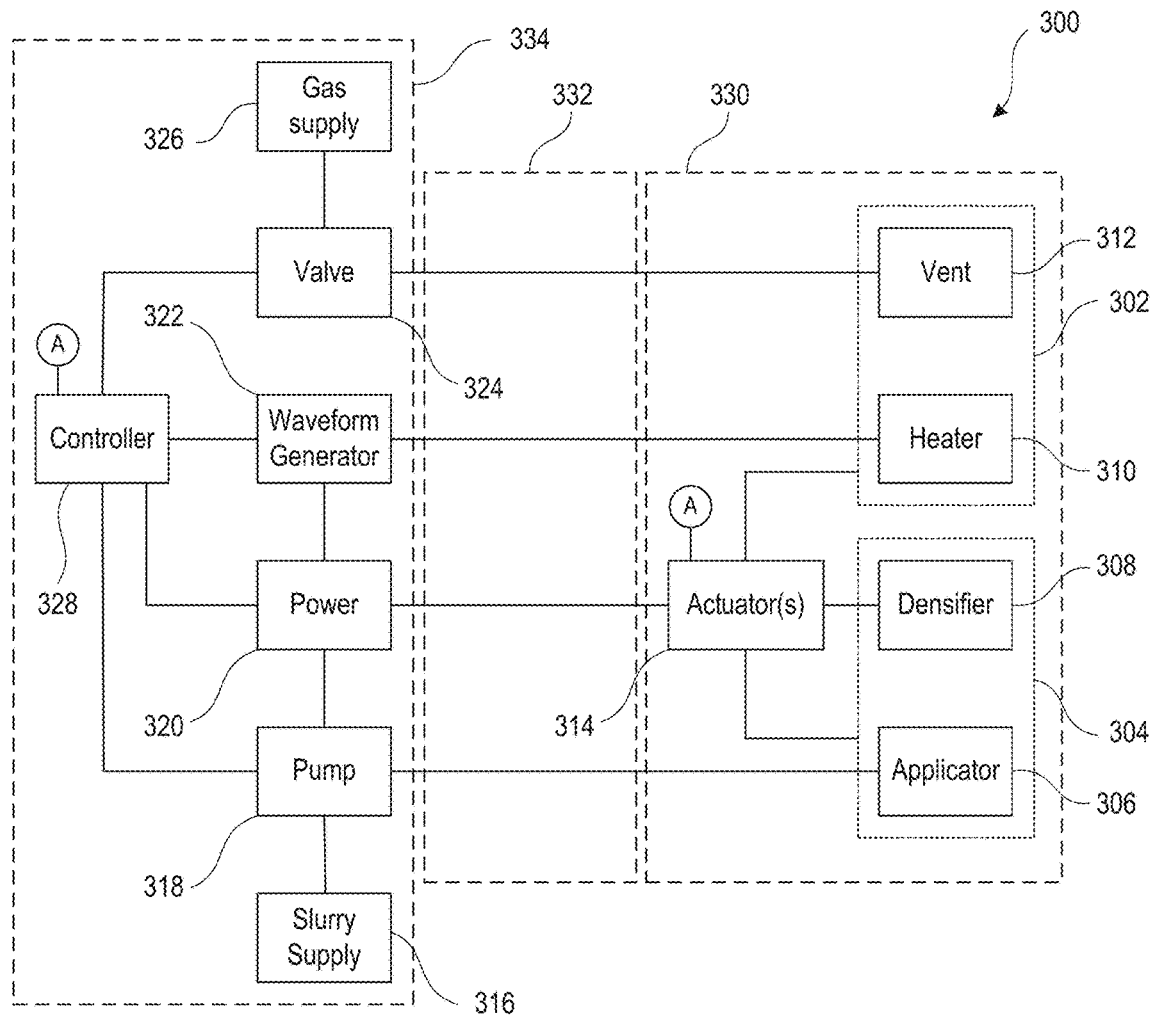
FIG. 3 is a simplified schematic diagram of a pipe repair system, according to one or more embodiments of the disclosed subject matter.

In some embodiments, a pipe repair system 300 can include a sintering head 302, a slurry head 304, an actuator assembly 314, and a control system 328, as shown in FIG. 3. The pipe repair system 300 can further include a supply 316 of slurry coupled to a pump 318 (e.g., hydraulic pump, industrial concrete pumping system, etc.), a supply 326 of inert gas coupled to one or more air control valves 324, and/or an electrical power supply 320 coupled to a waveform generator 322 (e.g., for supplying a current pulse). Alternatively or additionally, in some embodiments, system 300 can employ different components and/or can combine components together. For example, in some embodiments, waveform generator 322 can be integrated with electrical power supply 320. In another example, the air control valves can be replaced or supplemented by other conventional air handling components, for example, by using a pump to supply pressurized gas to vent 312.

In some embodiments, components 334 can be located outside (e.g., above ground) of the existing pipe being repaired, while components 330 can be located within the pipe. A supply line 332 can extend between the external components 334 and the internal components 330 to provide operative connections therebetween, for example, including an air conduit connecting valve 324 to a vent or outlet 312 of the sintering head 302, electrical wiring connecting waveform generator 322 to a Joule-heating element 310 of the sintering head 302, electrical wiring connecting power supply 320 to actuator assembly 314, and/or a hydraulic conduit connecting pump 318 to slurry application device 306.

The control system 328 can be operatively coupled to valve 324, waveform generator 322, pump 318, and/or actuator assembly 314 to control operation thereof in performing a pipe repair method. For example, the control system 328 can control actuator assembly 314 to position the slurry head 304 with respect to an inner surface of the existing pipe and then to control pump 318 to supply slurry from supply 316 to the slurry application device 306 as the slurry head 304 is moved in a circumferential direction, thereby applying a layer of slurry to the existing pipe. Simultaneously or subsequently, the control system 328 can control the actuator assembly 314 to radially move the densifying device 308 (also referred to herein as a densification device) to press a portion of the deposited slurry and/or to circumferentially move the densifying device 308 to a next portion of the deposited slurry for pressing. The control system 328 can further control waveform generator 322 to energize the Joule-heating element 310 (e.g., by applying a current pulse) and/or to circumferentially move the heating element 310 to a next portion of the deposited slurry for sintering. Simultaneously or subsequently, the control system 328 can control the valve 324 to provide an inert gas (e.g., nitrogen, argon, helium, neon, krypton, xenon, radon, oganesson, or any combination of the foregoing) to vent 312, for example, to remove and/or dissipate heat and/or provide an inert environment to avoid undesired chemical reactions within the pipe. In some embodiments, the inert gas from vent 312 can be directed at the heating element 310, at the portion of the slurry being subjected to sintering, or both. Alternatively or additionally, in some embodiments, the inert gas can be supplied to a cross-section of the pipe, for example, via vent 312 without specifically directing at the heating element or by changing a flow of fluid through the pipe (e.g., supplying nitrogen or argon at a speed of 15 m/hour).

In some embodiments, the actuator assembly 314 can include one or more actuators coupled to the sintering head 302, the slurry head 304, or both so as to move head 302 and/or head 304 along axial and/or circumferential directions within an existing pipe. In some embodiments, each head 302, 304, and/or each component of each head 302, 304, can be coupled to separate actuators, for example, to allow independent positioning. Alternatively or additionally, in some embodiments, the components and/or heads 302, 304 can share actuators, for example, to allow simultaneous positioning. For example, the one or more actuators 314 can include motors coupled to wheels (e.g., as a pipe crawler) and/or a winding machine (e.g., rotates and traverses within the pipe). In some embodiments, the one or more actuators 314 can be configured to position head 302 and/or head 304 along a radial direction, for example, to follow an inner circumferential surface of the existing pipe and/or to maintain a predetermined spacing (e.g., <5 mm) from the inner surface of the existing pipe.

Figures 4A, 4B, 4C:
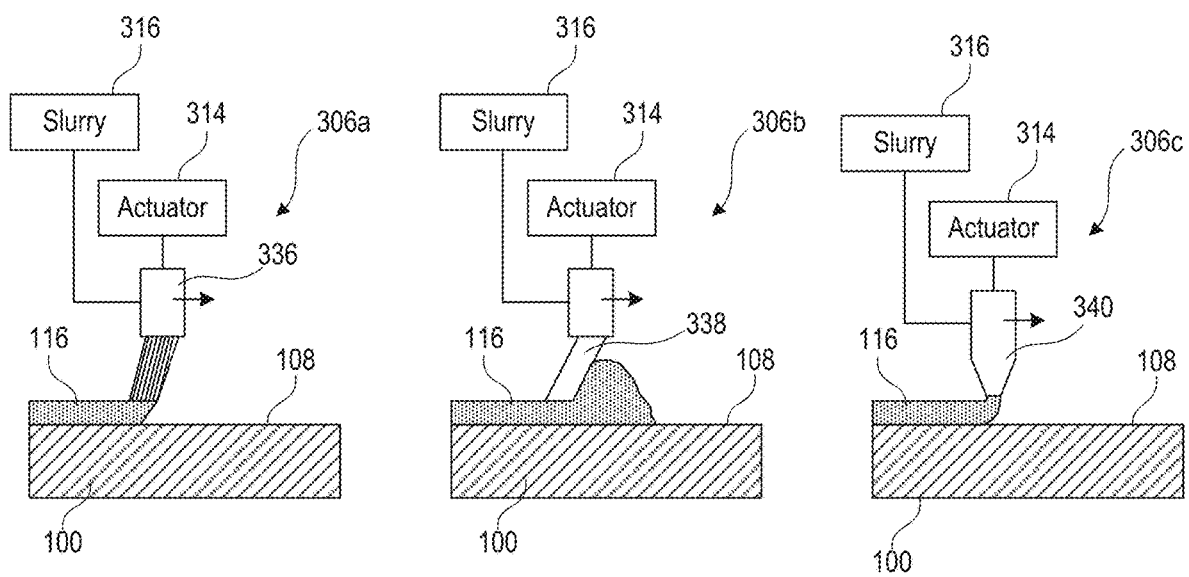
FIGS. 4A-4C are simplified cross-sectional views showing operations of exemplary slurry application devices employing a brush, doctor blade, and extrusion nozzle, respectively, according to one or more embodiments of the disclosed subject matter.

In some embodiments, the slurry application device 306 can include a brush, a spatula or doctor blade, an extrusion nozzle (e.g., printhead, syringe), a spray nozzle, or a conduit (e.g., dispensing pipe). For example, FIG. 4A illustrates an exemplary slurry application device 306a that is or comprises a brush 336. In such a configuration, the slurry can be supplied to a port in the brush 336 (e.g., flowing through bristles of the brush) and/or deposited onto the surface in front of the brush 336. In another example, FIG. 4B illustrates an exemplary slurry application device 306b that is or comprises a doctor blade 338. In such a configuration, the slurry can be supplied to a port in the blade 338 (e.g., flowing along a front surface of the blade) and/or deposited onto the surface in front of the blade 338. In yet another example, FIG. 4C illustrates an exemplary slurry application device 306c that is or comprises an extrusion nozzle 340 (e.g., printhead). In such a configuration, the slurry can be supplied to an inlet of the nozzle 340 and dispensed through an outlet tip of the nozzle.

Figure 5A:
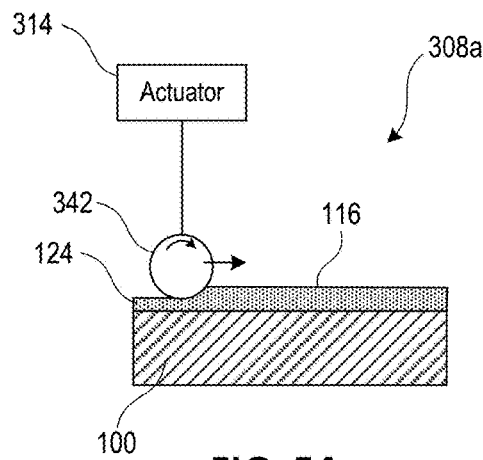
FIGS. 5A-5B are simplified cross-sectional views showing operations of exemplary densifying devices employing a roller and a radial-pressing mechanism, respectively, according to one or more embodiments of the disclosed subject matter.
Figure 5B:
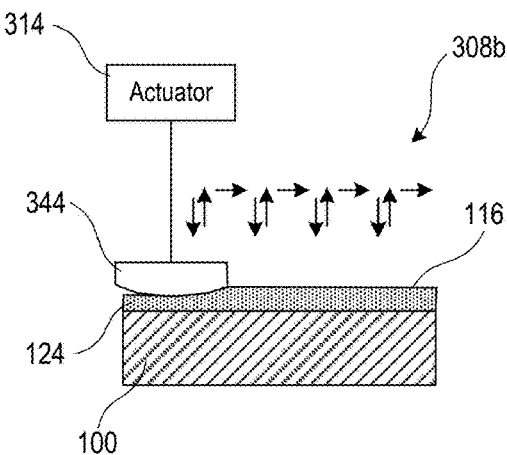

In some embodiments, the densification device 308 can include a roller (e.g., for continuous pressing) or a platen (e.g., for discontinuous or interval pressing). For example, FIG. 5A illustrates an exemplary densification device 308a that is or comprises a roller 342. In some embodiments, the roller 342 can be actively rotated, for example, such that an actuator rotates the roller 342 about its central axis in order to translate the roller 342 circumferentially as it presses. Alternatively, in some embodiments, the roller 342 can be passively rotated, for example, such that an actuator translates the roller 342 circumferentially and friction between the roller 342 and the slurry 116 causes the roller 342 to rotate about its central axis. In another example, FIG. 5B illustrates another exemplary densification device 308b that is or comprises a platen 344. In some embodiments, the platen 344 can be moved radially outward to press into a portion of slurry 116 to cause densification thereof, after which the platen 344 can be retracted and repositioned along the circumferential direction for pressing a next portion of the slurry 116.

Figure 6A:
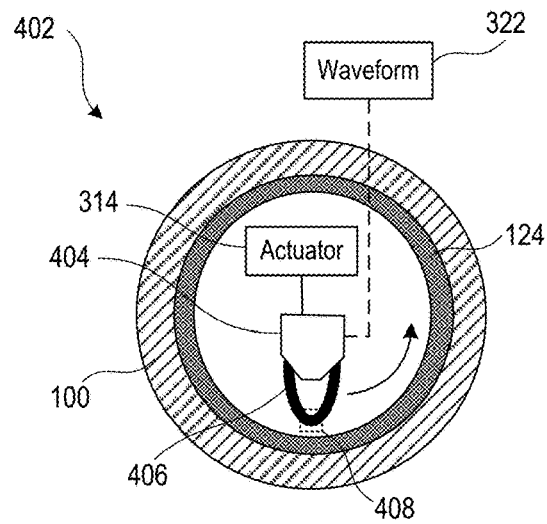
FIGS. 6A-6B are simplified cross-sectional views showing operations of exemplary sintering devices employing a U-shaped heating element and a V-shaped heating element, respectively, according to one or more embodiments of the disclosed subject matter.
Figure 6B:
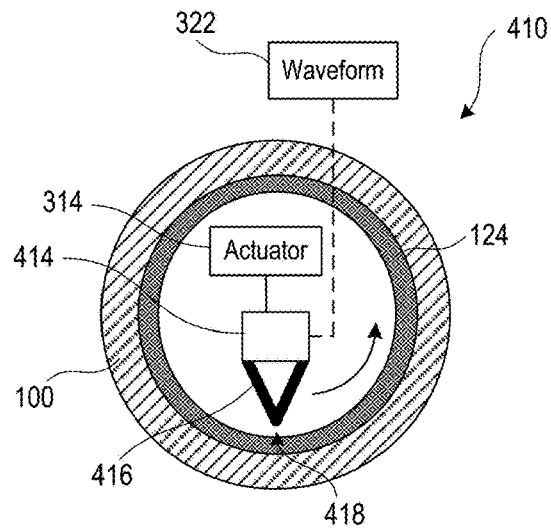
Figure 6C:
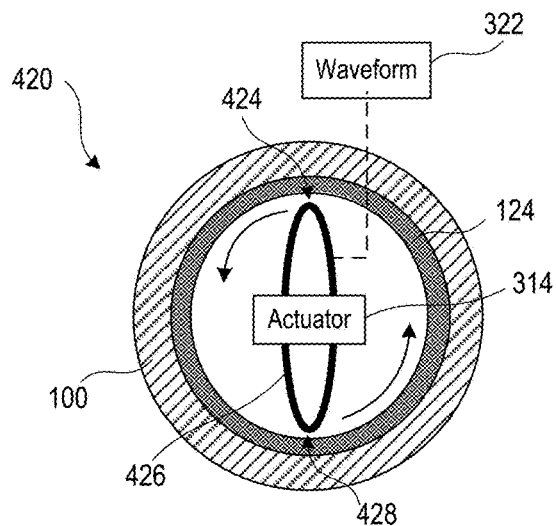
FIGS. 6C-6D are simplified cross-sectional views showing operations of exemplary sintering devices employing heating elements with multiple apices, respectively, according to one or more embodiments of the disclosed subject matter.
Figure 6D:
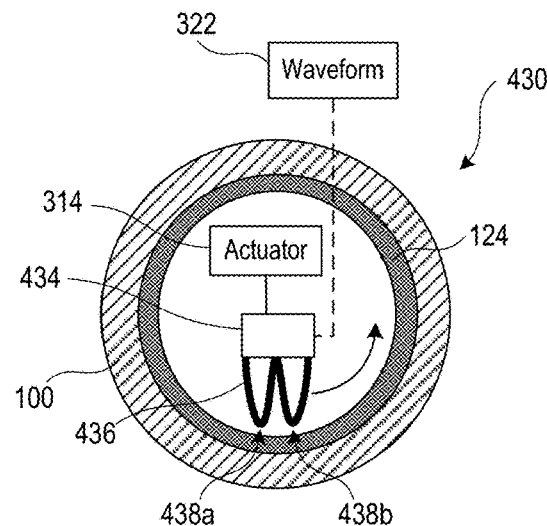
Figure 6E:
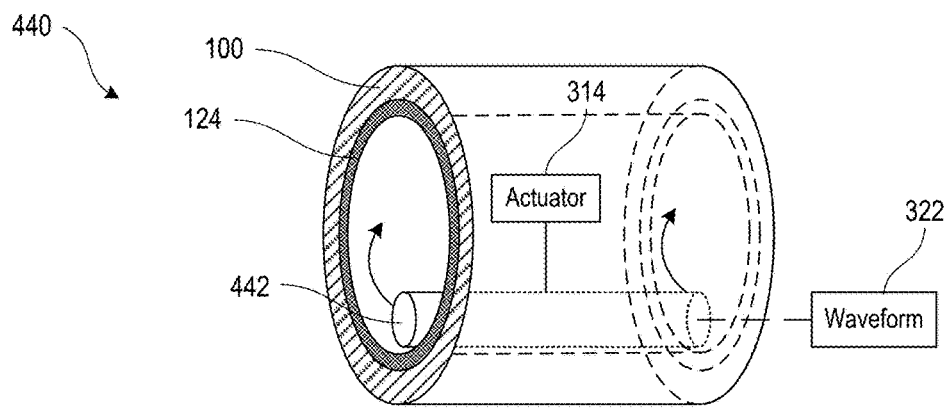
FIG. 6E is a simplified isometric view showing operations of an exemplary sintering device employing a rod-shaped heating element.

In some embodiments, the Joule-heating element 310 can have a curved (e.g., nonlinear) configuration in one or more cross-sectional views, for example, at a region of the heating element 310 closest to the slurry layer and/or designed to provide the sintering temperature. Alternatively or additionally, the Joule-heating element 310 can be formed of a flexible material so as to adopt a curved configuration, for example, to follow a curved surface of a pipe (e.g., at a bend or junction). In some embodiments, the curved heating element can have one or more peaks or apices that provide a heating spot (e.g., between 1 mm$^2$ and 10 cm$^2$) on or proximal to the slurry layer. For example, FIG. 6A illustrates an exemplary configuration 402 employing a sintering head 404 with a substantially U-shaped heating element 406. The U-shaped heating element 406 can have an apex that defines a heating spot 408 for sintering the slurry layer 124. In another example, FIG. 6B illustrates an exemplary configuration 410 employing a sintering head 414 with a substantially V-shaped heating element 416, which may define a narrower size heating spot 418. In another example, FIG. 6C illustrates an exemplary configuration 420 employing a substantially O-shaped or oval-shaped heating element 426. By virtue of its multiple apices, the oval-shaped heating element 426 can provide a first heating spot 424 and a second heating spot 428 on a radially opposite side of the pipe 100, for example, to sinter multiple portions of the slurry layer 124 simultaneously. In another example, FIG. 6D illustrates an exemplary configuration 430 employing a sintering head 434 with a substantially W-shaped heating element 436. By virtue of its multiple apices, the W-shaped heating element 436 can provide a first heating spot 438a and a second heating spot 438b on a same side of the pipe 100, for example, to sinter multiple portions of the slurry layer 124 simultaneously. In another example, FIG. 6E illustrates an exemplary configuration 440 employing a rod-shaped heating element 442. By virtue of its curved, axially-extending surface facing the inner circumferential surface of the pipe 100, the rod-shaped heating element 442 can sinter multiple portions of the slurry layer 124 simultaneously.

Figure 6F:
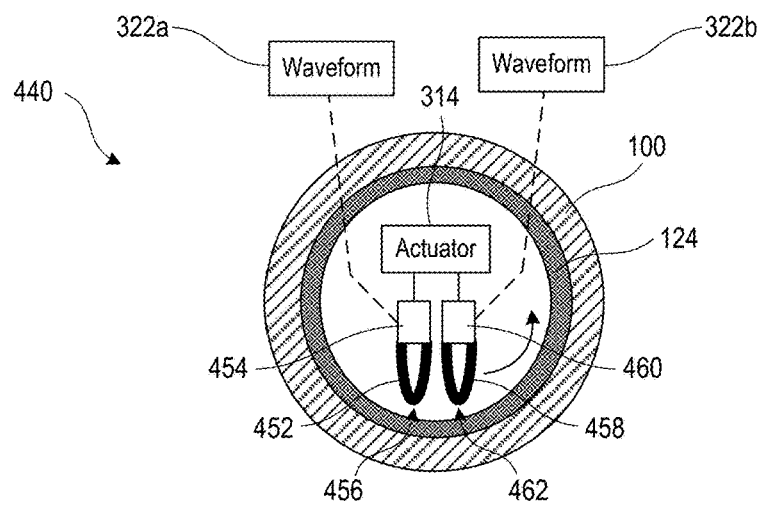
FIG. 6F is a simplified cross-sectional view of an exemplary sintering device employing multiple curved heating elements, according to one or more embodiments of the disclosed subject matter.

In some embodiments, multiple heating elements can be used, for example, to sequentially subject the slurry to different temperatures. For example, FIG. 6F illustrates an exemplary configuration 450 employing a first sintering head 454 with a first heating element 452 and a second sintering head 460 with a second heating element 458. The first heating element 452 can be coupled to waveform generator 322a, for example, to be energized by a current pulse to generate a sintering temperature (e.g., ~2000° C.) for heating spot 456. The second heating element 458 can be coupled to waveform generator 322b, for example, to be energized by a current pulse to generate a pre-sintering or conditioning temperature less than the sintering temperature (e.g., ~1000° C.) for heating spot 462. In some embodiments, the pre-sintering or conditioning temperature can be used to prepare the pipe for subsequent slurry application, for example, by cleaning the pipe surface by burning off organics. Alternatively or additionally, in some embodiments, the pre-sintering or conditioning temperature can be effective to partially or fully dry the applied slurry layer (e.g., by evaporating solvent therein) prior to sintering. Although sintering heads 454 and 460 are shown separately in FIG. 6F, in some embodiments, sintering heads 454, 460 can be combined together in a single sintering head, for example, where heating elements 452 and 458 are moved together in parallel. Alternatively or additionally, although heating elements 452 and 458 are shown adjacent to each other in FIG. 6F, in some embodiments, the heating elements 452, 458 can be provided at different orientations (e.g., at a 90° arrangement, at a 180° arrangement, or any other arrangement), for example, to allow an interval between exposure to the conditioning temperature and exposure to the sintering temperature.

Figure 7A:
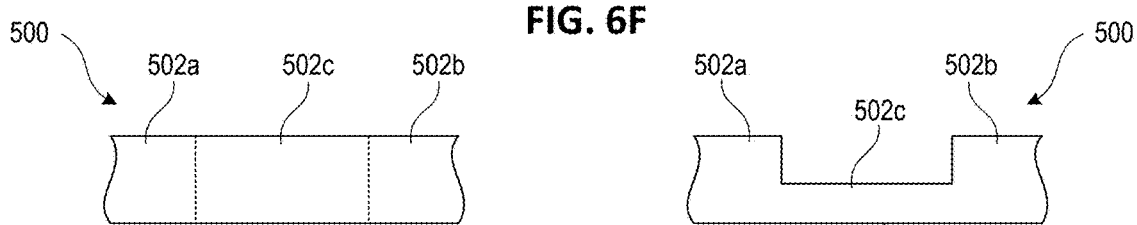
FIGS. 7A-7B are simplified plan and side views, respectively, of an exemplary heating element having a narrowed thickness, according to one or more embodiments of the disclosed subject matter.
Figure 7B:
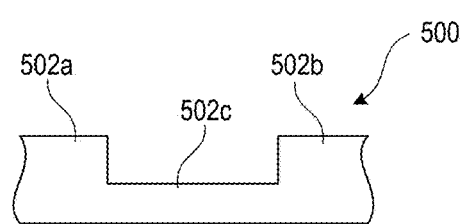
Figure 7C:
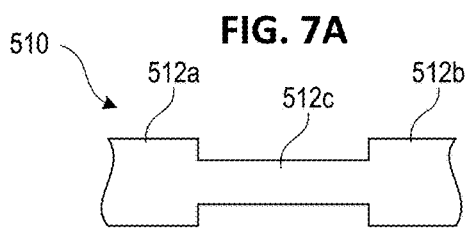
FIGS. 7C-7D are simplified plan and side views, respectively, of an exemplary heating element having a narrowed width, according to one or more embodiments of the disclosed subject matter.
Figure 7D:
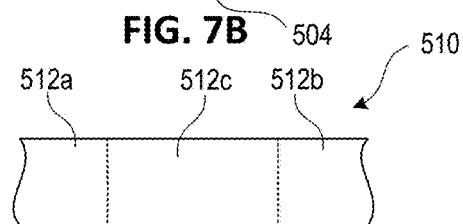
Figure 7E:
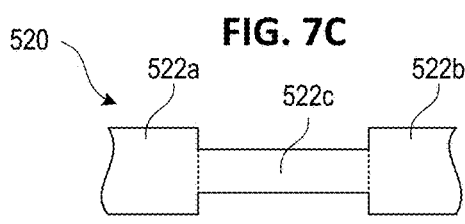
FIGS. 7E-7F are simplified plan and side views, respectively, of an exemplary heating element having both a narrowed width and thickness, according to one or more embodiments of the disclosed subject matter.
Figure 7F:
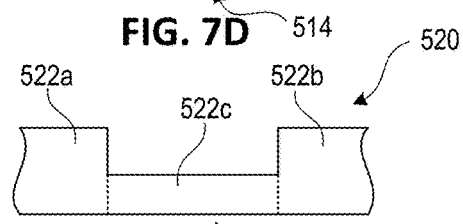

In some embodiments, the Joule-heating element 310 can have a narrowed cross-section, for example, at a region of the heating element 310 designed to provide the sintering temperature. The narrowed cross-section of the heating element can be effective to concentrate the heating at a region of the heating element closest to and/or touching the slurry layer, while regions of the heating element away from the slurry layer may be maintained at a lower temperature. For example, FIGS. 7A-7B illustrate a heating spot 500 (e.g., apex) of a heating element with a cross-section narrowed in a single dimension, in particular, a central region 502c having a reduced thickness (e.g., along a radial direction of the pipe) disposed between full-thickness regions 502a, 502b. Surface 504 of the reduced-thickness region 502c can face and/or contact the slurry layer or the circumferential wall of the pipe. In another example, FIGS. 7C-7D illustrate a heating spot 510 (e.g., apex) of another heating element with a cross-section narrowed in a single dimension, in particular, a central region 512c having a reduced width (e.g., along an axial direction or circumferential direction of the pipe) disposed between full-width regions 512a, 512b. Surface 514 of the reduced-width region 512c can face and/or contact the slurry layer or the circumferential wall of the pipe. In still another example, FIGS. 7E-7F illustrate a heating spot 520 (e.g., apex) of another heating element with a cross-section narrowed in two dimensions, in particular, a central region 522c having a reduced thickness and width disposed between full-size regions 522a, 522b. Surface 524 of the reduced-size region 522c can face and/or contact the slurry layer or the circumferential wall of the pipe.

Computer Implementation

Figure 8:
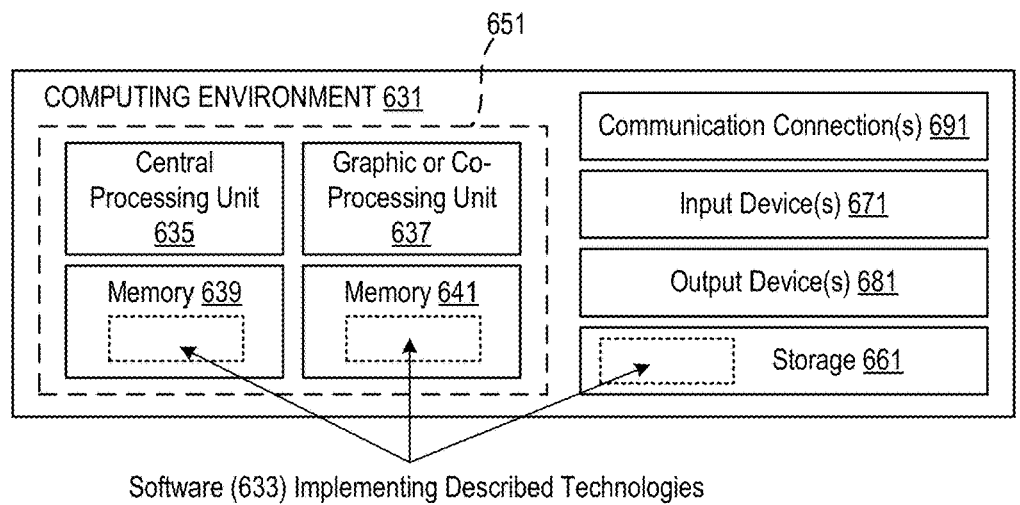
FIG. 8 depicts a generalized example of a computing environment in which the disclosed technologies may be implemented.

FIG. 8 depicts a generalized example of a suitable computing environment 631 in which the described innovations may be implemented, such as aspects of method 700 and/or control system 328. The computing environment 631 is not intended to suggest any limitation as to scope of use or functionality, as the innovations may be implemented in diverse general-purpose or special-purpose computing systems. For example, the computing environment 631 can be any of a variety of computing devices (e.g., desktop computer, laptop computer, server computer, tablet computer, etc.).

With reference to FIG. 8, the computing environment 631 includes one or more processing units 635, 637 and memory 639, 641. In FIG. 8, this basic configuration 651 is included within a dashed line. The processing units 635, 637 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6F shows a central processing unit 635 as well as a graphics processing unit or co-processing unit 637. The tangible memory 639, 641 may be volatile memory (e.g., registers, cache, RAM), non-volatile memory (e.g., ROM, EEPROM, flash memory, etc.), or some combination of the two, accessible by the processing unit(s). The memory 639, 641 stores software 633 implementing one or more innovations described herein, in the form of computer-executable instructions suitable for execution by the processing unit(s).

A computing system may have additional features. For example, the computing environment 631 includes storage 661, one or more input devices 671, one or more output devices 681, and one or more communication connections 691. An interconnection mechanism (not shown) such as a bus, controller, or network interconnects the components of the computing environment 631. Typically, operating system software (not shown) provides an operating environment for other software executing in the computing environment 631, and coordinates activities of the components of the computing environment 631.

The tangible storage 661 may be removable or non-removable, and includes magnetic disks, magnetic tapes or cassettes, CD-ROMs, DVDs, or any other medium which can be used to store information in a non-transitory way, and which can be accessed within the computing environment 631. The storage 661 can store instructions for the software 633 implementing one or more innovations described herein.

The input device(s) 671 may be a touch input device such as a keyboard, mouse, pen, or trackball, a voice input device, a scanning device, or another device that provides input to the computing environment 631. The output device(s) 671 may be a display, printer, speaker, CD-writer, or another device that provides output from computing environment 631.

The communication connection(s) 691 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, radio-frequency (RF), or another carrier.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smartphones or other mobile devices that include computing hardware, for example, such as industrial and/or non-industrial IoT "Internet of Things" devices). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java™, Python®, Perl, any/or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In any of the above-described examples and embodiments, provision of a request (e.g., data request), indication (e.g., data signal), instruction (e.g., control signal), or any other communication between systems, components, devices, etc. can be by generation and transmission of an appropriate electrical signal by wired or wireless connections.

Pipe Repair Methods

Figure 9:
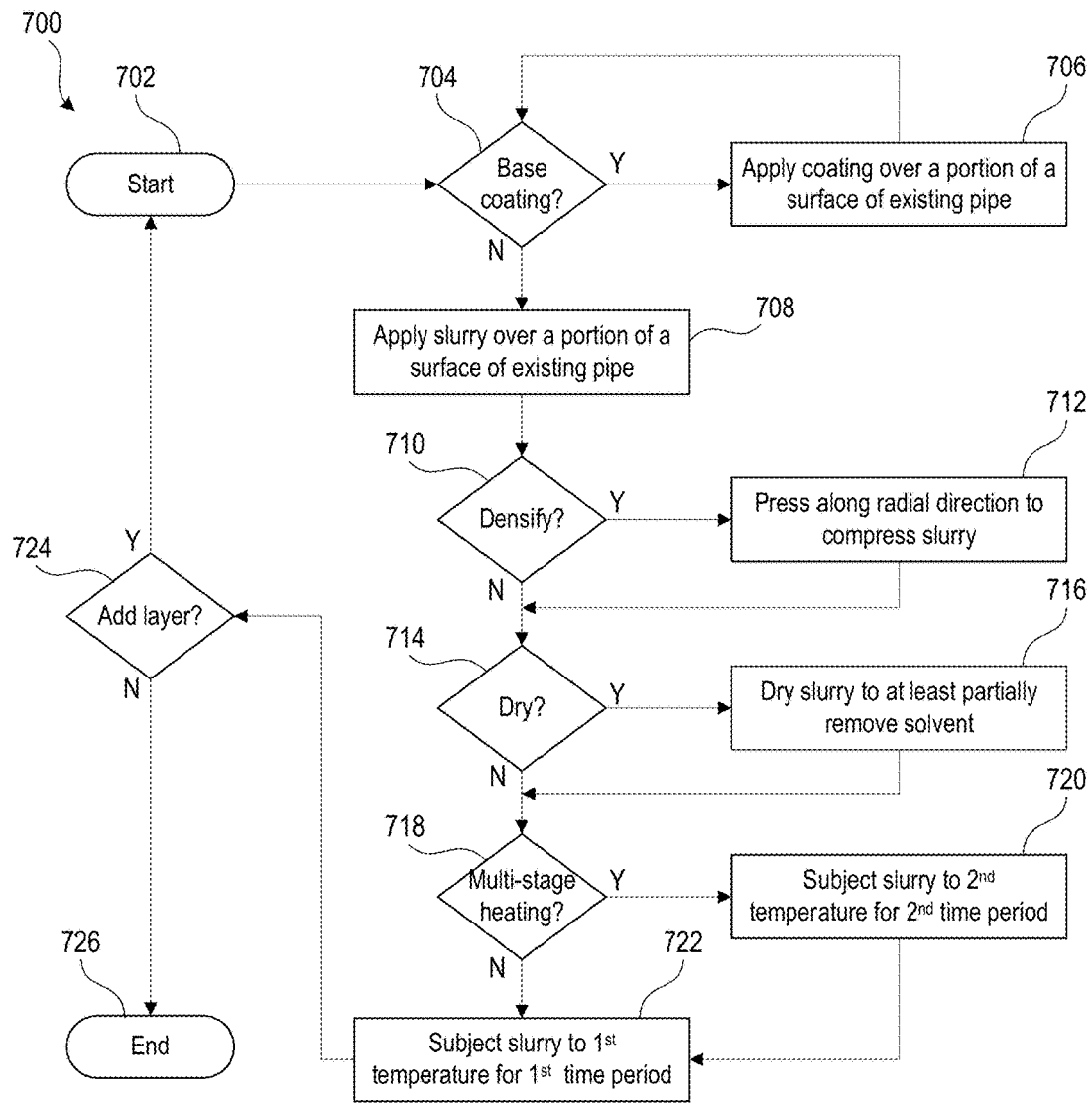
FIG. 9 is a process flow diagram of an exemplary method for repairing a pipe, according to one or more embodiments of the disclosed subject matter.

FIG. 9 illustrates an exemplary method 700 for repairing a pipe according to one or more embodiments of the disclosed subject matter. The method 700 can initiate at terminal 702 and proceed to decision block 704, where it is determined if a base coating is desired. If a base coating is desired, the method 700 can proceed to process block 706, where the base coating is applied or otherwise formed on or over a portion (e.g., annular strip) of a surface (e.g., inner circumferential surface) of an existing pipe. In some embodiments, the base coating can be an insulating layer (e.g. similar to insulating layer 204 described above), a transition layer (e.g., similar to transition layer 138 described above), or any other type of layer. In some embodiments, the base coating can be applied using a brush, a spatula or doctor blade, a pump coupled to an extrusion nozzle, a pump coupled to a spray nozzle, a pump coupled to a conduit, or any combination thereof. Alternatively or additionally, in some embodiments, the base coating can be formed via vapor deposition, sputtering, chemical reaction (e.g., oxidation), etc. Additional base coatings can be applied by returning to decision block 704 and process block 706.

If no base coating (or no additional base coatings) is desired at decision block 704, the method 700 can proceed to process block 708, where a slurry can be applied on or over a portion of a surface (e.g., inner circumferential surface) of the existing pipe. In some embodiments, the slurry can be applied to only part of the pipe surface, for example, for spot repair or patching. Alternatively, in some embodiments, the slurry can be applied to an entire circumference (e.g., an annular strip) of the pipe, for example, to form an entirely new pipe within the existing pipe. As noted above, the slurry can be a mixture of one or more metal powders, one or more binders, and one or more solvents, for example, having a viscosity in a range of 0.5 Pa-s to 5 Pa-s, inclusive. In some embodiments, the slurry can be applied on or over the pipe surface via a brush, a spatula or doctor blade, a pump coupled to an extrusion nozzle (e.g., printhead), a pump coupled to a spray nozzle, or a pump coupled to a conduit (e.g., dispensing pipe).

The method 700 can proceed to decision block 710, where it is determined if the applied slurry should be densified prior to sintering. If densification is desired, the method 700 can proceed to process block 712, where the slurry is compressed by radially pressing against the pipe wall. For example, the densification of process block 712 can be similar to that described above with respect to FIGS. 1C, 3, 5A, and/or 5B. After densification at process block 712, or if densification was not desired at decision block 710, the method 700 can proceed to decision block 714, where it is determined if the applied slurry should be dried prior to sintering. If drying is desired, the method 700 can proceed to process block 716, wherein some or all of the solvent in the slurry is removed via evaporation. For example, the drying of process block 716 can include air drying, forced air flow, infrared irradiation, preheating (e.g., using the sintering heating element, or a separate heating element, to subject the slurry to a temperature less than the sintering temperature) or any combination thereof.

After drying at process block 716, or if drying was not desired at decision block 714, the method 700 can proceed to decision block 718, where it is determined if the applied slurry should be subjected to multi-stage heating. If multi-stage heating is desired, the method 700 can proceed to process block 720, where the slurry can be subjected to a second temperature for a second time period. The second temperature can be less than a melting temperature of a metal in the slurry. For example, the second temperature can be about 1000° C., and the second time period can be about 10 seconds (e.g., averaged to a spot). In some embodiments, subjecting the slurry to the second temperature for the second time period can be effective to remove solvent and/or binder from the slurry (e.g., to evaporate solvent and/or carbonize the binder). In some embodiments, the second temperature of process block 720 can be provided by the sintering heating element energized to a lower temperature or a separate heating element, for example, in a manner similar to that described above with respect to FIG. 6F.

After the heating of process block 720, or if multi-stage heating was not desired at decision block 718, the method 700 can proceed to process block 722, where the slurry can be subjected to a first temperature for a first time period. The first temperature can be greater than a melting temperature of a metal in the slurry. For example, the first temperature can be about 2000° C., and the first time period can be about 10 seconds (e.g., averaged to a spot). In some embodiments, subjecting the slurry to the first temperature for the first time period can be effective to sinter the slurry into a solid metal layer. In some embodiments, the first time period may initiate immediately after the conclusion of the second time period, for example, such that the temperature proceeds directly to the first temperature from the second temperature. Alternatively, the first time period may be delayed after the second time period, for example, such that the temperature drops below the second temperature (e.g., dropping to room or ambient temperature) before increasing to the first temperature. In some embodiments, the first temperature of process block 722 can be provided by the sintering heating element, for example, in a manner similar to that described above with respect to FIGS. 1D, 2, 6A-6F, and/or 7A-7F.

The method 700 can proceed to decision block 724, where it is determined if additional layers (e.g., base coatings or sintered metal layers) are desired. If additional layers are desired, the method 700 can proceed from decision block 724 back to start 702 to restart the method. Alternatively, if additional layers are not desired, the method 700 can proceed from decision block 724 to terminator 726, where the sintered metal layer serves to repair, recondition, and/or replace the existing pipe.

Although some of blocks 702-726 of method 700 have been described as being performed once, in some embodiments, multiple repetitions of a particular process block may be employed before proceeding to the next decision block or process block. In addition, although blocks 702-726 of method 700 have been separately illustrated and described, in some embodiments, process blocks may be combined and performed together (simultaneously or sequentially). For example, the drying of process block 716 can be combined with the subjecting to the second temperature of process block 720. Moreover, although FIG. 9 illustrates a particular order for blocks 702-726, embodiments of the disclosed subject matter are not limited thereto. Indeed, in certain embodiments, the blocks may occur in a different order than illustrated or simultaneously with other blocks.

Slurry Deposition Machines for Pipe Repair

Figure 10:
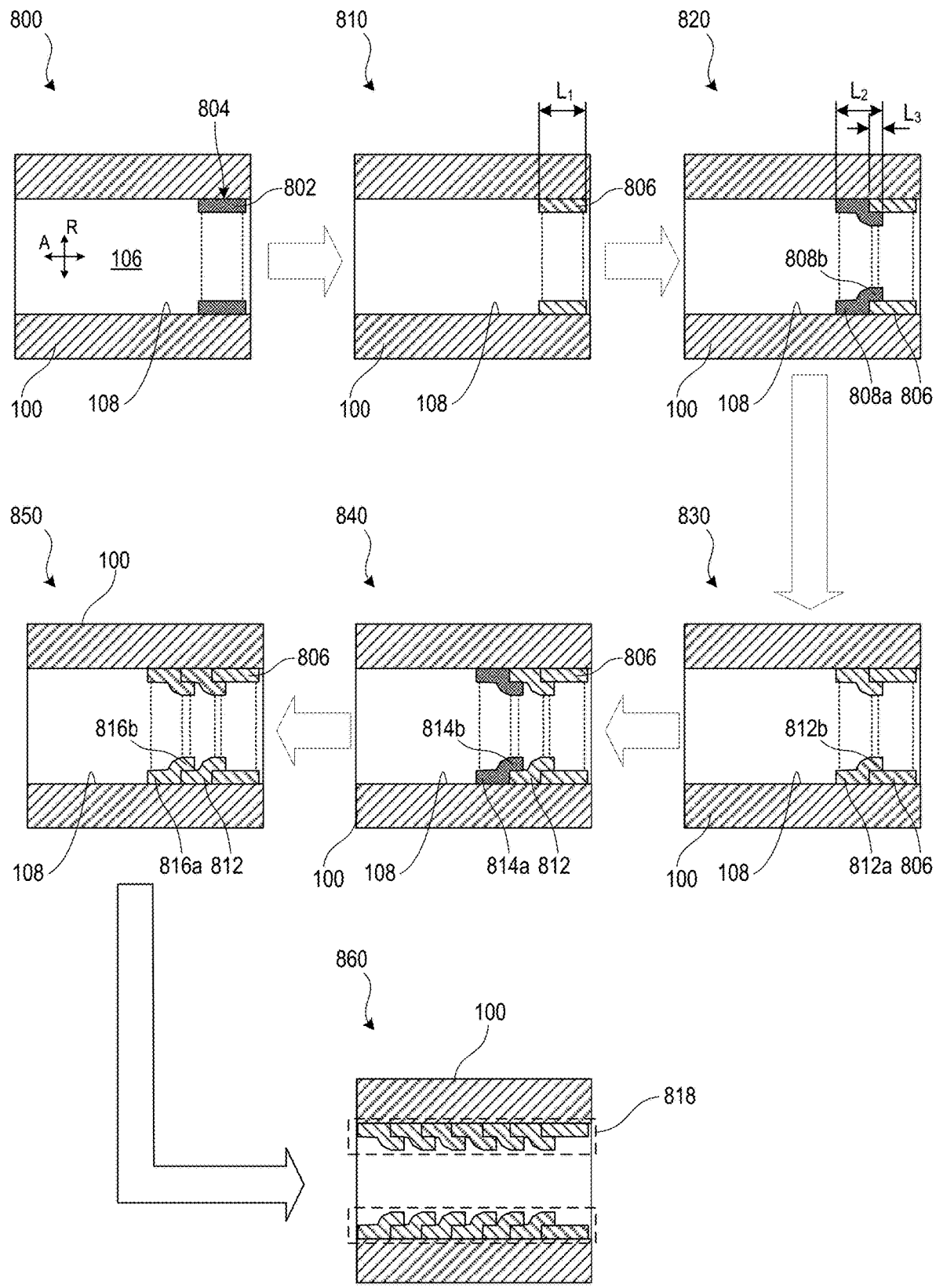
FIG. 10 illustrates phases of another exemplary pipe repair method employing deposition and sintering of overlapping layers, according to one or more embodiments of the disclosed.

In some embodiments, the metal coating formed by the high-temperature sintering can shrink as it cools, which can result in gaps between separately formed metal coating portions. To ensure a continuous surface of the metal coating to function as a new pipe within an existing pipe, subsequently-formed metal coating portions can overlap with previously-formed metal coating portions. For example, FIG. 10 illustrates phases of an exemplary pipe repair method that employs coating portions that overlap along an axial direction A of an existing pipe 100. During a first slurry application stage 800, a first circumferential strip 802 of slurry can be applied onto or over a first portion 804 of an inner circumferential surface 108 of the pipe 100, for example, in a manner similar to that described above with respect to FIG. 1B. In some embodiments, the first circumferential strip 802 of slurry can be densified by a densification device, for example, in a manner similar to that described above with respect to FIG. 1C. During a first sintering stage 810, the applied slurry strip 802 can be converted into a first solid metal strip 806, for example, in a manner similar to that described above with respect to FIG. 1D. In some embodiments, the first solid metal strip 806 can have a first length, $L_1$, along the axial direction A of the pipe 100.

In some embodiments, the pipe repair system can increment to the next portion of the inner circumferential surface 108 of the pipe 100, for example, by moving along the axial direction A further into the pipe 100. During a second slurry application stage 820, a second circumferential strip of slurry can be applied onto or over inner circumferential surface 108 of the pipe, for example, in a manner similar to first slurry application stage 800. However, a first portion 808a of the second circumferential strip can be formed on the surface 108 of the pipe 100a, while a second portion 808b of the second circumferential strip can be formed on and overlapping with the first solid metal strip 806. In some embodiments, the application of the second circumferential strip 808 overlapping with the first solid metal strip 806 can take advantage of any residual heat therein (e.g., from first sintering stage 810), for example, to at least partially dry (e.g., by evaporating solvent) the second circumferential strip 808 prior to second sintering stage 830.

The second circumferential strip can have a second length, $L_2$, along the axial direction A of the pipe 100, while the overlapping second portion 808b can have an overlap length, $L_3$, along the axial direction A. In some embodiments, the amount of overlap (e.g., length $L_3$) can be selected to be equal to or exceed an expected or observed amount of shrinkage along the axial direction A of the metal coating after sintering. For example, the overlap length, $L_3$, prior to or after sintering can be at least 10% of the first length $L_1$ or the second length $L_2$. In some embodiments, the second circumferential strip of slurry (e.g., portion 808a, portion 808b, or both) can be densified prior to sintering, for example, in a manner similar to that described above with respect to FIG. 1C. During a second sintering stage 830, the second circumferential strip can be converted into a second solid metal strip (e.g., with first portion 812a formed on surface 108 and second portion 812b formed on and overlapping with first solid metal strip 806), for example, in a manner similar to first sintering stage 810.

As shown at stage 860, in some embodiments, a solid metal pipe 818 without gaps can be formed within the existing pipe 100, for example, by repeatedly incrementing the pipe repair system to the next portion of the inner circumferential surface 108 of the pipe 100, applying a circumferential strip of slurry in an overlapping configuration (e.g., portions 814a, 814b applied via a third slurry application stage 840), and sintering to form another solid metal strip (e.g., metal strip portions 816a, 816b via a third sintering application stage 850). In some embodiments, a pipe repair system can apply slurry and sinter in a continuous spiral strip rather than separate circumferential strips, where adjacent portions of the spiral strip substantially aligned along the circumferential direction can overlap along the axial direction.

Sintering Machines for Pipe Repair

FIGS. 11A-11B show an exemplary configuration of a pipe repair system 900, for example, for applying slurry 116 to an inner circumferential surface 108 of an existing pipe 100. In the illustrated example, the pipe repair system 900 includes a first pipe repair head 902, an axially-extending support member 912, and an actuation assembly 906 for providing circumferential and/or axial movement. The first pipe repair head 902 can have a radially-extending arm 904 and a slurry deposition nozzle 914 coupled to a distal end of arm 904. In some embodiments, part or all of the arm 904 can be telescopic and/or displaceable along the radial direction. For example, the arm 904 can move the slurry deposition nozzle 914 along a radial direction into position with respect to the pipe surface 108 for slurry deposition (e.g., to follow variations in the surface 108 to maintain contact or a predetermined gap), for repair system 900 initiation (e.g., to move the nozzle 914 adjacent to or into contact with the surface 108), and/or for repair system 900 removal (e.g., to move the nozzle 914 out of contact with the surface 108) to allow the system 900 to be withdrawn axially. In some embodiments, the system 900 can employ active feedback (e.g., force sensing, visual sensing, distance sensing, etc.) to control a radial location of nozzle 914 via arm 904, such that nozzle 914 tracks or follows the pipe surface 108 as it moves along the circumferential and/or axial directions.

In some embodiments, the first pipe repair head 902 can also include a densification device, for example, a compression roller 916. The compression roller 916 can be spaced from the nozzle 914 (e.g., at a 10° angle or any other angle) and positioned so as to press the applied slurry 116 at a trailing end of the nozzle 914 as the first pipe repair head 902 is rotated around the circumferential direction. Alternatively or additionally, the compression roller 916 can be provided separate from the first pipe repair head 902, for example, on a separate arm extending from the central support member 912 which can be positioned independently from (e.g., rotated circumferentially at different times and/or different rates) or in sync (e.g., rotated circumferentially at the same time and the same rate) with the first pipe repair head 902.

In some embodiments, the actuation assembly 906 can include a circumferential actuator 908 (e.g., a winding machine that rotates within the pipe) and/or an axial actuator 910 (e.g., a motor coupled to wheels, such as a pipe crawler, to move the head 902 along the axial direction). The circumferential actuator 908 can be coupled to the first pipe repair head 902 and can move the arm 904, and thereby slurry deposition nozzle 914, around the inner circumference of pipe 100 (e.g., using support member 912 as a pivot or center of rotation). In some embodiments, the circumferential actuator 908 can move the slurry deposition nozzle 914 along the circumferential direction as slurry is dispensed from the slurry deposition nozzle 914, for example, slurry supplied from source 316 (e.g., disposed external to the pipe, for example, at a pipe access point) by pump 318 (e.g., a hydraulic pump) to nozzle 914 via fluid conduit 918 extending through support member 912. The first pipe repair head 902 can thus deposit a circumferential strip of slurry 116 for subsequent sintering. In some embodiments, the axial actuator 910 can move the slurry deposition nozzle 914 along the axial direction prior to or after dispensing of slurry from deposition nozzle 914, for example, to move to a different axial location for applying another circumferential strip of slurry 116 for sintering. Alternatively or additionally, in some embodiments, the circumferential actuator 908 and the axial actuator 910 can operate simultaneously, for example, to move the slurry deposition nozzle 914 as slurry is dispensed in order to apply a spiral strip of slurry for sintering.

In addition to or in place of active tracking of the pipe surface 108, the first pipe repair head can employ passive features to track the pipe surface, for example, to accommodate pipe ovality, deformation, and other surface variations, and/or to wipe dispensed slurry to a set thickness on the pipe surface 108. For example, the first pipe repair head can employ mechanical compensation. In some embodiments, the slurry deposition nozzle and/or the pipe repair head can include smoothing features (e.g., flat or curved surfaces adjacent to outlet orifice of the nozzle), which can ensure a set thickness of the slurry is deposited and/or allows for deposition in a spiral pattern.

Figure 11C:
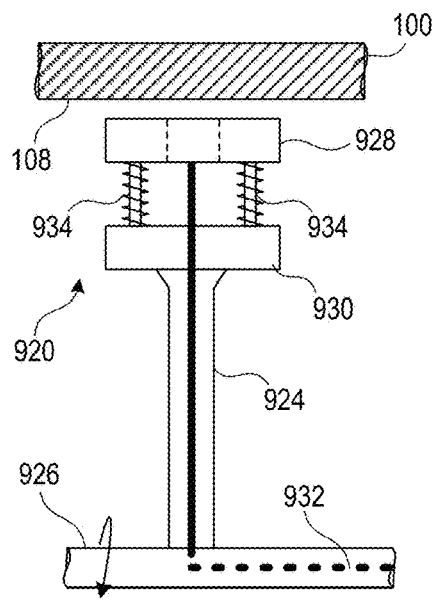
FIGS. 11C-11D are magnified views of pipe repair heads employing exemplary slurry deposition nozzles, according to one or more embodiments of the disclosed subject matter.

FIG. 11C shows an exemplary configuration of a pipe repair head 920 that employs mechanical compensation. In the illustrated example, pipe repair head 920 has a slurry deposition nozzle 928 for applying slurry (e.g., a viscous thixotropic metallic slurry) from fluid conduit 932 onto the inner surface 108 of existing pipe 100. The slurry deposition nozzle 928 can be supported at a distal end of radial arm 924, which in turn can be coupled at its proximal end to axial support member 926. For example, the slurry deposition nozzle 928 can be coupled to a fixture 930 at the distal end of the radial arm 924 by one or more spring members 934, which allow the slurry deposition nozzle 928 to passively displace along the radial direction to accommodate variations in the pipe surface 108.

Figure 11D:
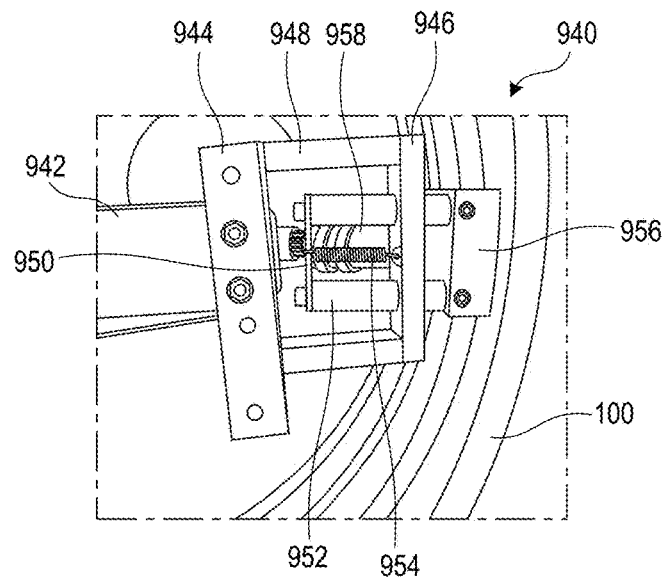

FIG. 11D shows another exemplary configuration of a pipe repair head 940 that employs mechanical compensation. In the illustrated example, pipe repair head 940 has a slurry deposition nozzle 956 for applying slurry from fluid conduit 958 onto the inner surface 108 of the existing pipe 100. A head mount plate 944 can be rigidly coupled to a distal end of radial arm 942 and to base plate 946 via lateral support members 948. Support members 952 can extend through holes in the base plate 946, where first ends of the support members 952 are coupled to the deposition nozzle 956. Opposite second ends of the support members 952 can be coupled to an urging plate 950, and a biasing spring 954 can connect the urging plate 950 to the base plate 950. The biasing sprint 954 thus urges the nozzle 956 radially outward toward the pipe 100 via the urging plate 950 and the support members 952, while the support members 952 within holes of the base plate 946 allow the arm 942 to move the nozzle 956 along circumferential and/or axial directions. Other configurations for employing passive mechanical compensation to position the slurry deposition nozzle with respect to the pipe surface are also possible according to one or more contemplated embodiments.

FIGS. 12A-12B show an exemplary configuration of another pipe repair system 1000, for example, for sintering a previously-applied slurry 116 to an inner circumferential surface 108 of an existing pipe 100. In the illustrated example, the pipe repair system 1000 includes a second pipe repair head 1002, an axially-extending support member 1012, and an actuation assembly 1006 for providing circumferential and/or axial movement. The second pipe repair head 1002 can have a radially-extending arm 1004 and a heating element 1014 (e.g., a Joule-heating element, for example, similar to that described above with respect to any of FIGS. 1D, 2, 6A-7F) coupled to a distal end of arm 1004. In some embodiments, part or all of the arm 1004 can be telescopic and/or displaceable along the radial direction. For example, the arm 1004 can move the heating element along a radial direction into position with respect to the pipe surface 108 for slurry deposition (e.g., to follow variations in the surface 108 to maintain contact or a predetermined gap, for example, ≤5 mm), for repair system 1000 initiation (e.g., to move the heating element 1014 adjacent to or into contact with the surface 108), and/or for repair system 1000 removal (e.g., to move the heating element 1014 out of contact with or away from the surface 108) to allow the system 1000 to be withdrawn axially. In some embodiments, the system 1000 can employ active feedback (e.g., force sensing, visual sensing, distance sensing, etc.) to control a radial location of heating element 1014 via arm 1004, such that heating element 1014 tracks or follows the pipe surface 108 as it moves along the circumferential and/or axial directions. For example, a heat shield coupled to the heating element 1014 and/or arm 1004 can be used to engage the slurry 116 (e.g., partially or fully dried slurry) and/or to apply a controlled force thereto during sintering by the heating element 1014.

In some embodiments, the actuation assembly 1006 can include a circumferential actuator 1008 (e.g., a winding machine that rotates within the pipe) and/or an axial actuator 1010 (e.g., a motor coupled to wheels, such as a pipe crawler, to move the head 1002 along the axial direction). The circumferential actuator 1008 can be coupled to the second pipe repair head 1002 and can move the arm 1004, and thereby heating element 1014, around the inner circumference of pipe 100 (e.g., using support member 1012 as a pivot or center of rotation). In some embodiments, the circumferential actuator 1008 can move the heating element 1014 along the circumferential direction while the heating element 1014 is energized, for example, a current pulse supplied to the heating element 1014 from electrical power source 322 (e.g., disposed external to the pipe, for example, at a pipe access point) via electrical supply line 1028 extending through support member 1012, so as to provide a sintering period (e.g., a sintering temperature for a duration of ≤10 seconds). Alternatively, in some embodiments, the circumferential actuator 1008 can move the heating element 1014 along the circumferential direction between sintering periods (e.g., in increments while the heating element 1014 is not energized). In some embodiments, the axial actuator 1010 can move the heating element 1014 along the axial direction prior to or after sintering, for example, to move to a different axial location for sintering another circumferential strip of slurry 116. Alternatively or additionally, in some embodiments, the circumferential actuator 1008 and the axial actuator 1010 can operate simultaneously, for example, to move the heating element in a spiral configuration for sintering.

In some embodiments, a gas flow can be provided to the heating element and/or a region of the sintered metal layer proximal to heating element, for example, to provide enhanced cooling of the heating element and/or the sintered metal layer (e.g., to generate a cooling ramp rate of than $10^2$-$10^{4\circ}$ C./s), to shield the slurry from undesired chemical reactions during sintering, and/or for any other reason. In some embodiments, the gas flow can comprise an inert gas. In the illustrated example of FIGS. 12A-12B, a flow 1018 of gas from inert gas supply 326 can be provided via one or more vents 1016 on the second pipe repair head 1002 and a gas supply line 1026 that extends through support member 1012. Alternatively or additionally, in some embodiments, the gas flow can be provided via vents in arm 1004 and/or central support member 1012, for example, where it is desired to fill all or most of a cross-section of the pipe 100 with the inert gas.

Figure 12C:
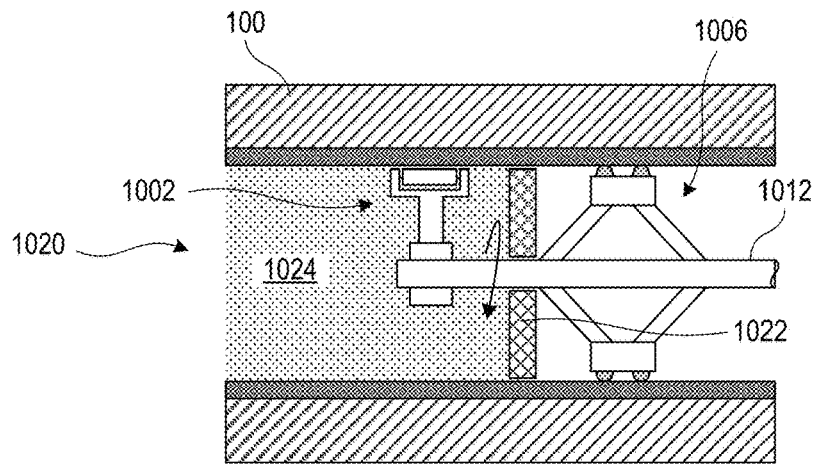
FIGS. 12C-12D are axial cross-sectional views of exemplary pipe repair systems employing moving baffles, according to one or more embodiments of the disclosed subject matter.
Figure 12D:
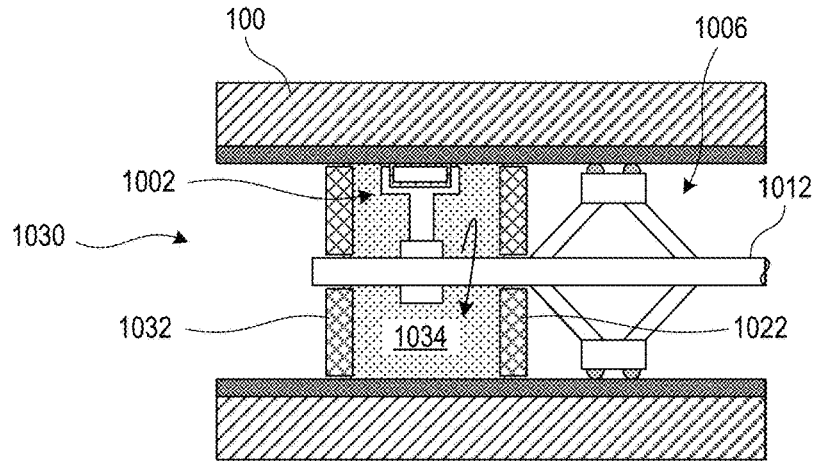

In some embodiments, the inert gas can be at least partially contained within a section of the pipe, for example, by one or more baffles. In some embodiments, the baffles can also function as a heat shield, for example, protecting temperature sensitive components of the pipe repair system from the high temperature of the heating element. For example, FIG. 12C illustrates an exemplary pipe repair system 1020 employing a rear baffle 1022 disposed along an axial direction of the pipe 100 between the pipe repair head 1002 and part of actuation assembly 1006. The rear baffle 1022 can delineate a volume 1024 where the inert gas (e.g., supplied via pipe repair head 1002 and/or support member 1012) can be at least partially contained. Alternatively, in some embodiments, multiple baffles can be used to further contain the inert gas and/or shield axial regions from the high temperature of the heating element. For example, FIG. 12D illustrates an exemplary pipe repair system 1030 employing a forward baffle 1032 and a rear baffle 1022. The baffles 1022, 1032 can further delineate a narrow axial volume 1034 surrounding the pipe repair head 1002 where the inert gas (e.g., supplied via pipe repair head 1002 and/or support member 1012) can be at least partially contained. In some embodiments, each baffle can be coupled to support member 1012 to move therewith.

Machines with Integrated Deposition and Sintering for Pipe Repair

In FIGS. 11A-11D, a pipe repair system employs a single pipe repair head to apply a slurry layer over a surface of the existing pipe. In FIGS. 12A-12D, a pipe repair system employs a single pipe repair head to subject a slurry layer to a short duration sintering temperature to form a solid metal layer that can replace or otherwise repair the existing pipe. In some embodiments, such slurry application and sintering capabilities can be combined in a single pipe repair system, for example, via separate pipe repair heads supported by the same central support member 1112.

Figures 13A, 13B:
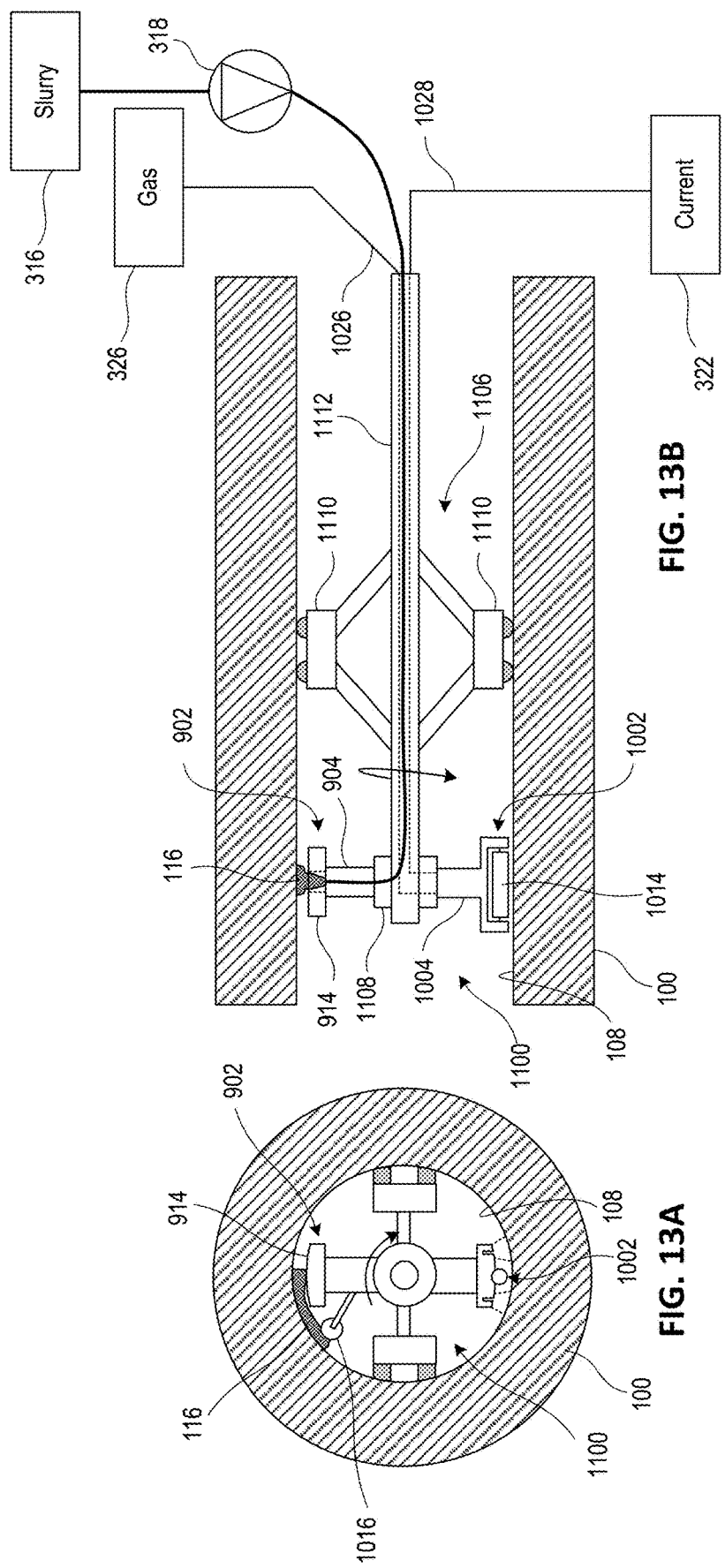
FIGS. 13A-13B are radial and axial cross-sectional views, respectively, of another exemplary configuration of a pipe repair system for depositing and sintering a slurry, according to one or more embodiments of the disclosed subject matter.

For example, FIGS. 13A-13B illustrates an exemplary pipe repair system 1100 employing a first pipe repair head 902 and a second pipe repair head 1002 mounted on a common axially-extended support member 1112. The first pipe repair head 902 can be constructed and operated in a manner similar to the pipe repair head described with respect to FIGS. 11A-11B above or with respect to either of FIGS. 11C-11D. The second pipe repair head 1002 can be constructed and operated in a manner similar to the pipe repair head described with respect to FIGS. 12A-12B above.

Figure 13C:
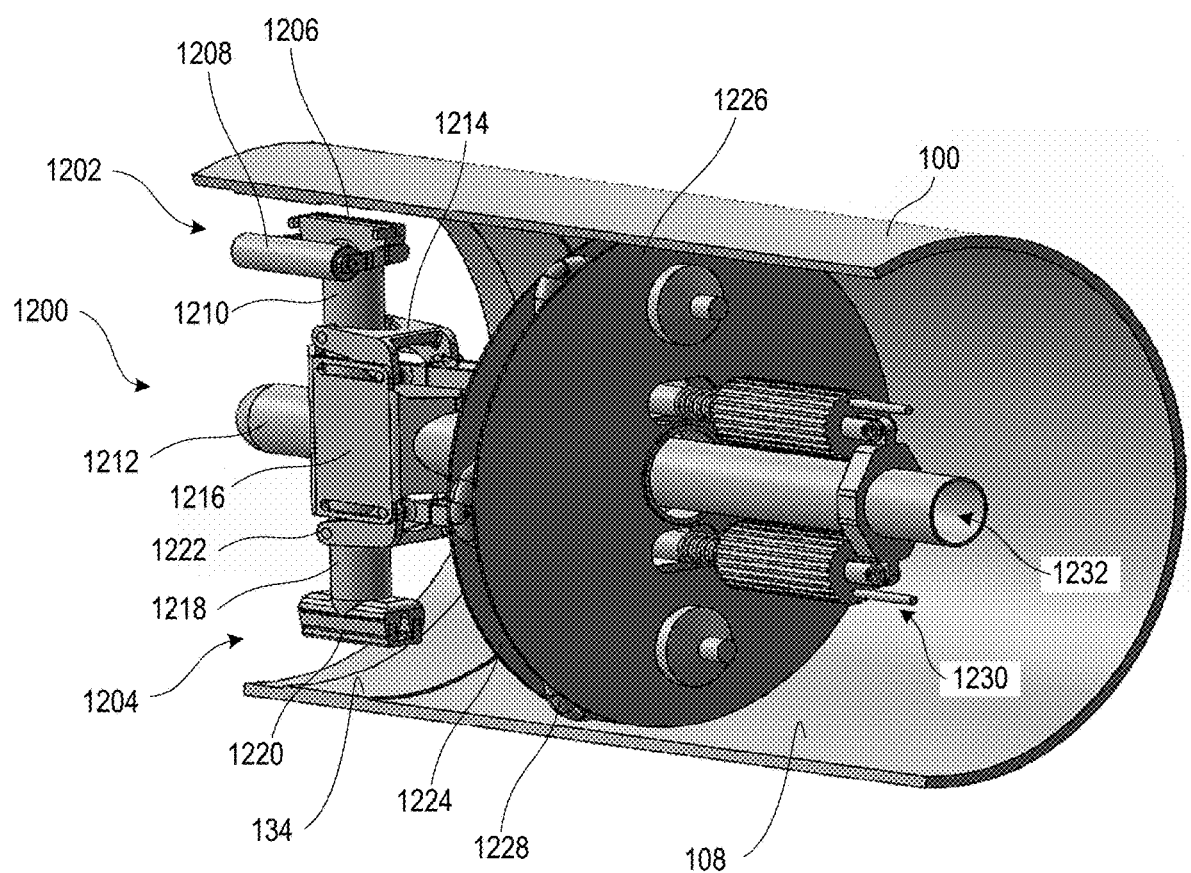
FIG. 13C is a perspective section view of another exemplary pipe repair system for depositing and sintering a slurry, according to one or more embodiments of the disclosed subject matter.

FIG. 13C illustrates another exemplary pipe repair system 1200 employing a first pipe repair head 1202 (e.g., for slurry application) and a second pipe repair head 1204 (e.g., for sintering). The first pipe repair head 1202 can have a slurry deposition nozzle 1206 coupled to an outer end of a first radially-extending arm 1210 and a compression roller 1208 extending along a circumferential direction from the slurry deposition nozzle 1206. The second pipe repair head 1204 can have a heating element 1220 coupled to an outer end of a second radially-extending arm 1218. The first arm 1210 and the second arm 1218 can be coupled to a central axially-extending support member 1212, for example, via support fixture 1216. In addition, the first arm 1210 and the second arm 1218 can be coupled to actuation assembly 1230 via first and second actuation members 1214, 1222, respectively, for example, to move the slurry deposition nozzle 1206 and/or heating element 1220 along the radial direction toward or away from the circumferential inner surface 108. The pipe repair system 1200 can further include first and second rear baffles 1224, 1226, which can be configured to rotate within pipe 100, for example, by virtue of rollers 1228 supported at a radially outer portion and in contact with the inner circumferential surface 108 of the pipe. Pipe repair system 1200 can be remotely powered and controlled over an electrical umbilical, and slurry, purging solvent, and/or shield gas can be delivered hydraulically through tubing, for example, extending through an inner volume 1232 of central support member 1212. In some embodiments, the system umbilical and tubing can be bundled into a single coil-able umbilical assembly that stretches from an access point outside the pipe 100 to the system components within the pipe.

In the illustrated examples of FIGS. 13A-13C, the first and second pipe repair heads are arranged on diametrically opposite points (e.g., collinear or at 180° orientation in an axial cross-sectional view). Alternatively, the first and second pipe repair heads can have a noncollinear arrangement in an axial cross-sectional view (e.g., while otherwise being located at substantially the same axial location). For example, an angle between the first and second pipe repair heads in an axial cross-sectional view can be less than 180° (e.g., ~90°). In the illustrated example, the pipe repair system includes an actuation assembly 1106 for providing circumferential and/or axial movement. For example, the actuation assembly 1106 can include a circumferential actuator 1108 (e.g., a winding machine that rotates within the pipe) and/or an axial actuator 1110 (e.g., a motor coupled to wheels, such as a pipe crawler, to move the head 902 along the axial direction). The circumferential actuator 1108 can be coupled to the first pipe repair head 902 and the second pipe repair head 1002, for example, to rotate the slurry deposition nozzle 914 and the heating element 1014 in tandem (e.g., simultaneously).

Figure 13D:
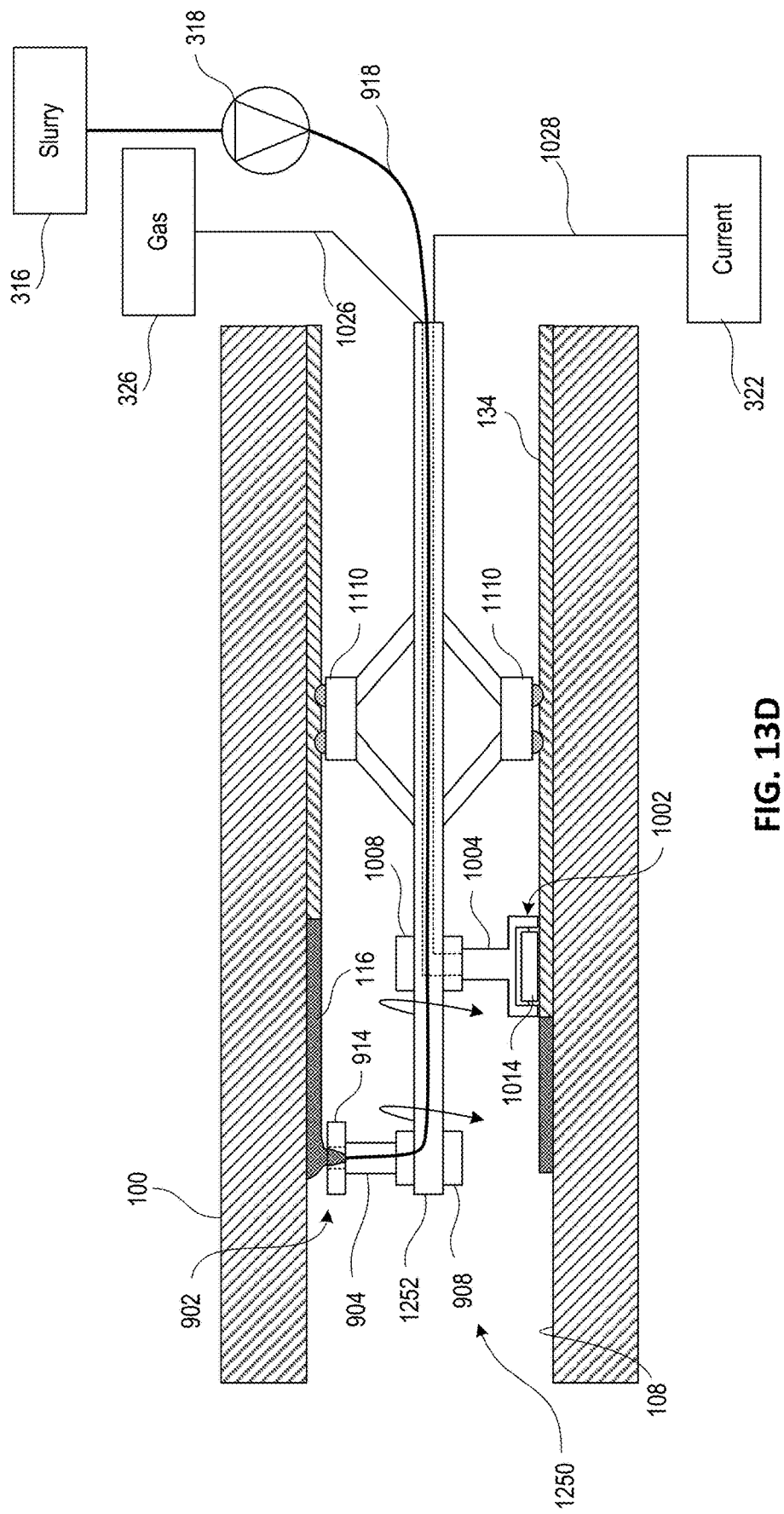
FIG. 13D is an axial cross-sectional view of another exemplary configuration of a pipe repair system for depositing and sintering a slurry, according to one or more embodiments of the disclosed subject matter.

Alternatively, in some embodiments, the first and second pipe repair heads can be offset from each other along the axial direction of the pipe 100. For example, FIG. 13D illustrates a pipe repair system 1250 where the first pipe repair head 902 is offset axially forward along the support member 1252 from the second pipe repair head 1002. In FIG. 13D, the first and second pipe repair heads can be arranged on diametrically opposite points (e.g., collinear or at 180° orientation) in an axial cross-sectional view. Alternatively, the first and second pipe repair heads can have a noncollinear arrangement in an axial cross-sectional view (e.g., while also being located at different axial locations). For example, an angle between the first and second pipe repair heads in an axial cross-sectional view can be less than 180° (e.g., ~90°). Alternatively, in some embodiments, the first pipe repair head 902 can move circumferentially independent of the second pipe repair head 1002, for example, such that an angle between them in the axial cross-sectional view is not fixed. For example, a first circumferential actuator 908 can be used to independently rotate the first pipe repair head 902, a second circumferential actuator 1008 can be used to independently rotate the second pipe repair head 1002, and axial actuator 1110 can be used to move the pipe repair heads 902, 1002 in tandem (e.g., simultaneously) axially.

FABRICATED EXAMPLES AND EXPERIMENTAL RESULTS

In some embodiments, due to sintering of metal powder (e.g., alloy) with polymeric binder (e.g., PVP), the resulting metal layer can develop a gradient distribution of carbide phase from an exposed surface of the metal layer (e.g., facing an inner volume of the pipe) to an interior of the metal layer (e.g., contacting or proximal to the existing pipe). For example, during the sintering, carbon released from the polymeric binder can introduce different carbide volume fractions and/or morphology throughout a thickness of the resulting sintered metal layer. In some embodiments, the carbide formation can be controlled by adjusting a percentage of polymeric binder and/or the parameters of the sintering (e.g., changing a heating rate, a cooling rate, or the sintering temperature).

Figure 14A:
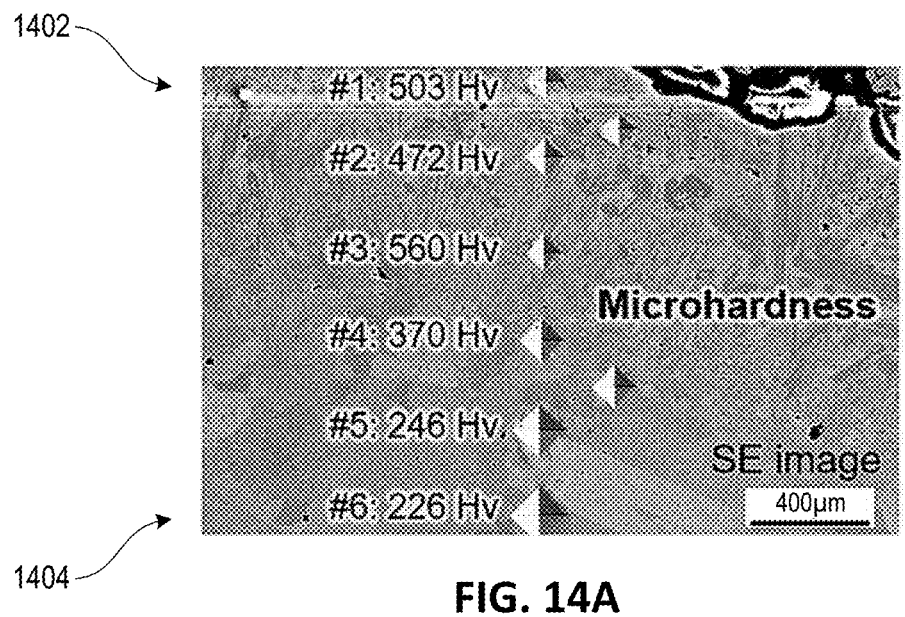
FIG. 14A illustrates a gradient of hardness in a metal pipe layer fabricated according to one or more embodiments of the disclosed subject matter.
Figure 14B:
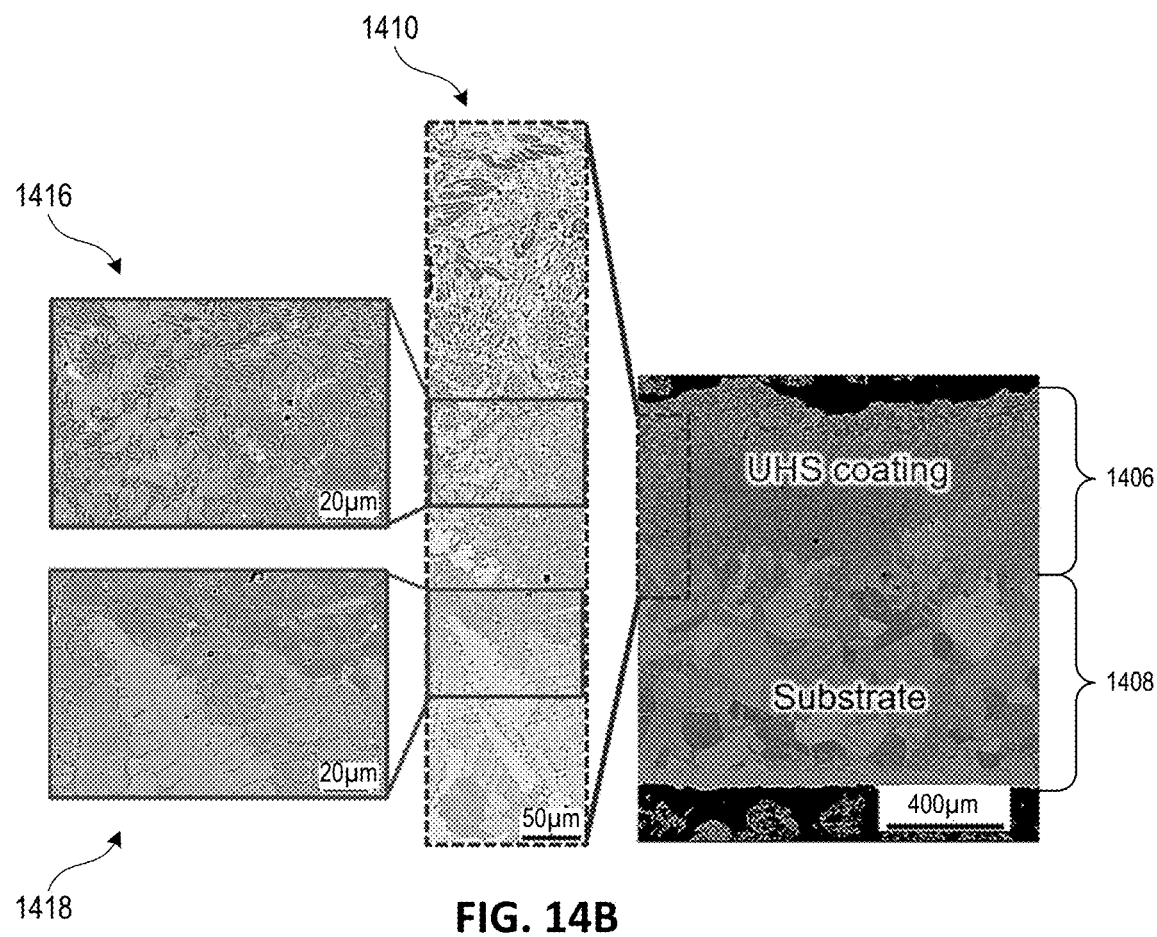
FIG. 14B are scanning electron microscopy (SEM) images of a cross-section of a pipe-in-pipe structure fabricated according to one or more embodiments of the disclosed subject matter.

Since the carbide exhibits high hardness, an inner surface of the sintered metal layer can develop a relatively higher hardness. Distribution of the carbon can vary from the inner surface toward an interior of the sintered layer, which in turn can provide a functionally gradient carbide layer, which can help harden the sintered metal layer and reduce hydrogen trapping effects. For example, as shown in FIG. 14A, the hardness (e.g., Vickers hardness) can vary between a radially inner section 1402 (e.g., closer to the inner volume) and a radially outer section 1404 (e.g., closer to the existing pipe), with higher hardness values proximal to the radially inner section 1402. FIG. 14B further illustrates the microstructure of the sintered metal layer 1406 (e.g., stainless steel) and the existing pipe layer 1408, including magnified view 1410 of an interface region between the sintered metal layer and the existing pipe, a magnified view 1416 of sintered metal layer 1406 adjacent a border with the existing pipe, and a magnified view 1418 of existing pipe layer adjacent a border with the sintered metal layer. The sintered layer 1409 can have a face-centered cubic (FCC) matrix with some carbide precipitation and Mo-rich regions. The carbides can be identified as the M7C3 phase, and small segregation of Mo can also appear.

CONCLUSION

Any of the features illustrated or described herein, for example, with respect to FIGS. 1A-14B, can be combined with any other feature illustrated or described herein, for example, with respect to FIGS. 1A-14B to provide systems, devices, structures, methods, and embodiments not otherwise illustrated or specifically described herein. For example, the curved heating elements of FIGS. 6A-6F can be applied to any of the systems or repair configurations of FIGS. 1A-5B and 7A-13D. Other combinations and variations are also possible according to one or more contemplated embodiments. Indeed, all features described herein are independent of one another and, except where structurally impossible, can be used in combination with any other feature described herein.

In view of the many possible embodiments to which the principles of the disclosed technology may be applied, it should be recognized that the illustrated embodiments are only examples and should not be taken as limiting the scope of the disclosed technology. Rather, the scope is defined by the following claims. We therefore claim all that comes within the scope and spirit of these claims.

The invention claimed is:

1. A system for in situ repair of a metal pipe, the system comprising:
    a first pipe repair head comprising:
        a first arm extending along a radial direction of the metal pipe; and
        a Joule heating element coupled to a distal end portion of the first arm so as to face an inner circumferential wall of the metal pipe;
    a support member extending along an axial direction of the metal pipe, the first pipe repair head being coupled to the support member;
    an actuation assembly constructed to move the first pipe repair head along the axial direction of the metal pipe, along a circumferential direction of the metal pipe, or along both the axial and circumferential directions;
    an electrical power supply operatively coupled to the Joule heating element; and
    a controller operatively coupled to the actuation assembly and the electrical power supply, the controller comprising one or more processors and computer readable storage media storing instructions that, when executed by the one or more processors, cause the controller to:
        (a) position, via the actuation assembly, the first pipe repair head with respect to a surface portion of the inner circumferential wall; and
        (b) apply, via the electrical power supply, a first current pulse to the Joule heating element such that the Joule heating element generates a first temperature of at least 1000° C. proximal to the surface portion.

2. The system of claim 1, wherein the computer readable storage media stores additional instructions that, when executed by the one or more processors, cause the controller to:
    (c) rotate, via the actuation assembly, the first pipe repair head along the circumferential direction to another surface portion of the inner circumferential wall of the metal pipe; and
    (d) re-apply, via the electrical power supply, the first current pulse to the Joule heating element such that the Joule heating element generates the first temperature proximal to the another surface portion.

3. The system of claim 2, wherein the computer readable storage media stores additional instructions that, when executed by the one or more processors, cause the controller to repeat (c) and (d) until the first pipe repair head has been rotated around an entire inner circumference of the metal pipe.

4. The system of claim 1, wherein a duration of the first current pulse is approximately 10 s.

5. The system of claim 1, wherein the electrical power supply and the Joule heating element are constructed such that:
    a heating ramp rate to the first temperature is in a range of $10^2$ to $10^4$ K/s, inclusive;
    a cooling ramp rate from the first temperature is in a range of $10^2$ to $10^4$ K/s, inclusive; or
    the heating and cooling ramp rates are both in a range of $10^2$ to $10^4$ K/s, inclusive.

6. The system of claim 1, wherein:
    the electrical power supply is located outside of the metal pipe and is connected to the Joule heating element via electrical wiring extending through an inner conduit in the support member; and/or
    the controller is located outside of the metal pipe and is connected to the actuation assembly via electrical wiring extending through an inner conduit in the support member.

7. The system of claim 1, further comprising:
    one or more baffles spaced along the axial direction from the first pipe repair head, each baffle extending along the radial direction of the metal pipe between an outer circumferential wall of the support member and the inner circumferential wall of the metal pipe so as to delimit a volume within the metal pipe.

8. The system of claim 1, further comprising:
    a gas supply providing an inert gas; and
    one or more supply outlets operatively coupled to the one or more supply outlets and constructed to release the inert gas proximal to the first pipe repair head within the metal pipe.

9. The system of claim 8, wherein the gas supply is located outside of the metal pipe and is connected to the one or more supply outlets via a fluid conduit in the support member.

10. The system of claim 1, wherein the computer readable storage media stores instructions that, when executed by the one or more processors, cause the controller to:
    position, via the actuation assembly, the first pipe repair head such that a spacing between the Joule heating element and a slurry deposited on the surface portion along the radial direction is approximately 5 mm or less; or
    position, via the actuation assembly, the first pipe repair head such that the Joule heating element is in contact with a slurry deposited on the surface portion.

11. The system of claim 1, wherein the Joule heating element is formed of carbon, silicon carbide, a metal, a metal alloy, or any combination of the foregoing.

12. The system of claim 1, further comprising:
a second pipe repair head coupled to the support member and comprising:
a second arm extending along the radial direction of the metal pipe; and
a slurry deposition nozzle coupled to a distal end portion of the second arm so as to face the inner circumferential wall of the metal pipe;
a supply of repair slurry, the repair slurry comprising a powder of metal or metal alloy, a polymeric binder, and an organic solvent; and
a pump operatively coupled to the slurry deposition nozzle and the supply of repair slurry,
wherein the controller is operatively coupled to the pump,
wherein the actuation assembly is further constructed to move the second pipe repair head along the axial direction, along the circumferential direction, or along both the axial and circumferential directions, and
wherein the computer readable storage media stores additional instructions that, when executed by the one or more processors, cause the controller to:
(e) position, via the actuation assembly, the second pipe repair head with respect to a second surface portion of the inner circumferential wall; and
(f) dispense, via the pump and the slurry deposition nozzle, an amount of repair slurry from the supply onto the second surface portion.

13. The system of claim 12, wherein the computer readable storage media stores instructions that, when executed by the one or more processors, cause the controller to perform (f) at a same time as or overlapping with (e), such that the amount of repair slurry is wiped or rolled onto the second surface portion.

14. The system of claim 12, wherein the computer readable storage media stores additional instructions that, when executed by the one or more processors, cause the controller to:

(g) rotate, via the actuation assembly, the second pipe repair head along the circumferential direction to another surface portion of the inner circumferential wall of the metal pipe; and
(h) dispense, via the pump and the slurry deposition nozzle, another amount of repair slurry from the supply onto the another surface portion.

15. The system of claim 14, wherein the computer readable storage media stores additional instructions that, when executed by the one or more processors, cause the controller to repeat (g) and (h) until the second pipe repair head has been rotated around an entire inner circumference of the metal pipe.

16. The system of claim 12, wherein the second pipe repair head further comprises a roller constructed to contact and press the dispensed repair slurry toward the inner circumferential wall of the metal pipe.

17. The system of claim 12, wherein the second pipe repair head further comprises a fixture supporting the slurry deposition nozzle on the second arm, the fixture being constructed to urge the slurry deposition nozzle into contact with the inner circumferential wall of the metal pipe.

18. The system of claim 12, wherein:
the supply of repair slurry and the pump are located outside of the metal pipe, and the pump is connected to the slurry deposition nozzle via a fluid conduit in the support member; or
the supply of repair slurry is located outside of the metal pipe, and the supply is connected to the pump via a fluid conduit in the support member.

19. The system of claim 12, wherein the second pipe repair head is at a same axial location on the support member as the first pipe repair head, and the second pipe repair head is spaced from the first pipe repair head along the circumferential direction.

20. The system of claim 12, wherein the second pipe repair head is at a different axial location on the support member than the first pipe repair head.

* * * * *